US012786780B2

(12) United States Patent
Meylan et al.

(10) Patent No.: US 12,786,780 B2
(45) Date of Patent: Nov. 3, 2026

(54) TECHNIQUES FOR UPLINK QUALITY OF SERVICE MANAGEMENT FOR SHARED CHANNEL TRANSMISSION

(71) Applicant: QUALCOMM Incorporated, San Diego, CA (US)

(72) Inventors: Arnaud Meylan, San Diego, CA (US); Reza Shahidi, San Diego, CA (US); Raghu Narayan Challa, San Diego, CA (US); Brian Clarke Banister, San Diego, CA (US); Lin Lu, San Diego, CA (US); Shanshan Wang, San Diego, CA (US); Michel Chauvin, San Diego, CA (US); Tienyow Liu, Santa Clara, CA (US); Leena Zacharias, San Jose, CA (US); Scott Hoover, Del Mar, CA (US); Troy Curtiss, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 1015 days.

(21) Appl. No.: 17/454,787

(22) Filed: Nov. 12, 2021

(65) Prior Publication Data

US 2022/0191730 A1 Jun. 16, 2022

Related U.S. Application Data

(60) Provisional application No. 63/199,163, filed on Dec. 10, 2020.

(51) Int. Cl.
*H04W 28/02* (2009.01)
*H04L 5/00* (2006.01)
(Continued)

(52) U.S. Cl.
CPC ....... *H04W 28/0268* (2013.01); *H04L 5/0053* (2013.01); *H04W 72/56* (2023.01); *H04W 76/15* (2018.02)

(58) Field of Classification Search
None
See application file for complete search history.

(56) References Cited

U.S. PATENT DOCUMENTS 10,827,499 B2 11/2020 Abedini et al.
2014/0376430 A1* 12/2014 Su .................... H04W 52/0212 370/311

(Continued)

FOREIGN PATENT DOCUMENTS

CN 102415187 A 4/2012
WO 2017197096 A1 11/2017

(Continued)

OTHER PUBLICATIONS

"SAR Evaluation Considerations for Wireless Handsets", Federal Communications Commission Office of Engineering and Technology Laboratory Division, 648474 D04, Handset SAR v01r03, Oct. 23, 2015, pp. 1-9.

(Continued)

*Primary Examiner* — Mohammad S Adhami
(74) *Attorney, Agent, or Firm* — Harrity & Harrity LLP/QUALCOMM Incorporated

(57) ABSTRACT

Various aspects of the present disclosure generally relate to wireless communication. In some aspects, a user equipment (UE) may transmit, based at least in part on a transmit configuration, a first communication associated with a first group of logical channels associated with at least a portion of an ON duration of an uplink transmission interval configuration. The UE may transmit, based at least in part on the transmit configuration, a second communication during at least a portion of an OFF duration of the uplink transmission (Continued)

interval configuration, wherein the transmit configuration indicates a first amount of energy for the first communication based at least in part on the first communication being associated with the first group of logical channels and a second amount of energy for the second communication based at least in part on the second communication being associated with a second group of logical channels. Numerous other aspects are provided.

50 Claims, 12 Drawing Sheets

(51) Int. Cl.
*H04W 72/56* (2023.01)
*H04W 76/15* (2018.01)

(56) References Cited

U.S. PATENT DOCUMENTS

2016/0142934 A1* 5/2016 Ahmadzadeh ........ H04W 28/06 370/328
2016/0360462 A1* 12/2016 Chockalingam .. H04W 36/0058
2017/0332333 A1 11/2017 Santhanam et al.
2019/0261289 A1 8/2019 Raghavan et al.
2019/0394822 A1 12/2019 Hosseini et al.
2020/0187046 A1* 6/2020 Bergquist .......... H04W 28/0278
2020/0359330 A1 11/2020 Zacharias et al.
2023/0217304 A1* 7/2023 Singh ................ H04W 72/1263 370/329
2026/0189973 A1 7/2026 Meylan

FOREIGN PATENT DOCUMENTS

WO 2019089174 5/2019
WO 2020218900 A1 10/2020
WO WO-2021021892 A1 2/2021

OTHER PUBLICATIONS

International Search Report and Written Opinion—PCT/US2021/072401—ISA/EPO—2022.
European Search Report—EP25218518—Search Authority—The Hague—Feb. 16, 2026.

* cited by examiner

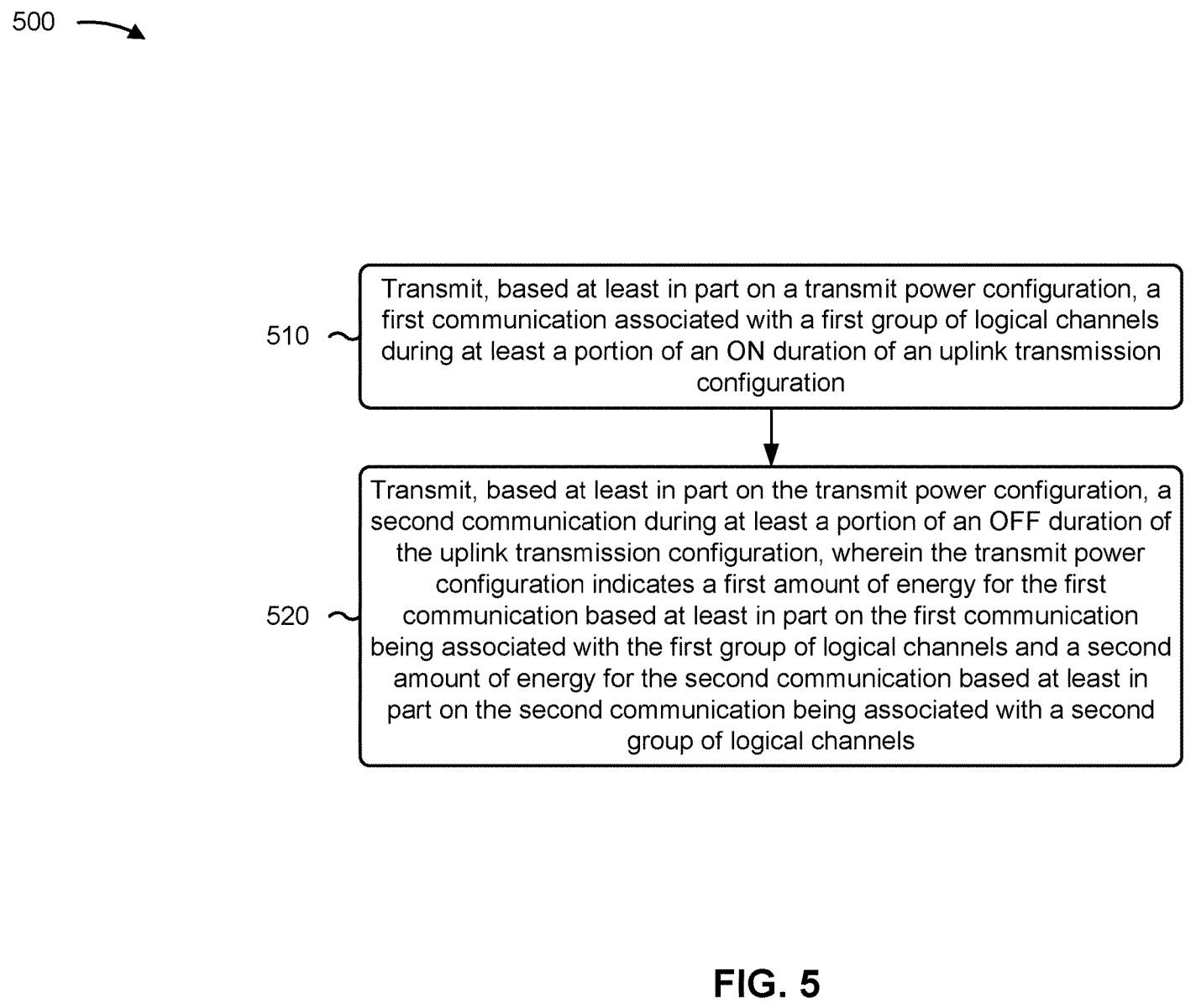

500

510 Transmit, based at least in part on a transmit power configuration, a first communication associated with a first group of logical channels during at least a portion of an ON duration of an uplink transmission configuration 520 Transmit, based at least in part on the transmit power configuration, a second communication during at least a portion of an OFF duration of the uplink transmission configuration, wherein the transmit power configuration indicates a first amount of energy for the first communication based at least in part on the first communication being associated with the first group of logical channels and a second amount of energy for the second communication based at least in part on the second communication being associated with a second group of logical channels

FIG. 5

TECHNIQUES FOR UPLINK QUALITY OF SERVICE MANAGEMENT FOR SHARED CHANNEL TRANSMISSION

CROSS-REFERENCE TO RELATED APPLICATION

This patent application claims priority to U.S. Provisional Patent Application No. 63/199,163, filed on Dec. 10, 2020, entitled "TECHNIQUES FOR UPLINK QUALITY OF SERVICE MANAGEMENT FOR SHARED CHANNEL TRANSMISSION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for uplink quality of service (QoS) management for shared channel transmission.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a B S via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting, based at least in part on a transmit configuration, a first communication associated with at least a portion of a first time interval of an uplink transmission interval configuration, wherein the first communication is associated with a first priority level and a first number of bytes. The method may include transmitting, based at least in part on the transmit configuration, a second communication during at least a portion of a second time interval of the uplink transmission interval configuration, wherein the transmit configuration indicates the first number of bytes based at least in part on the first communication being associated with the first priority level and a second number of bytes based at least in part on the second communication being associated with a second priority level.

Some aspects described herein relate to a UE for wireless communication. The user equipment may include a memory and one or more processors coupled to the memory. The one or more processors may be configured to transmit, based at least in part on a transmit configuration, a first communication associated with at least a portion of a first time interval of an uplink transmission interval configuration, wherein the first communication is associated with a first priority level and a first number of bytes. The one or more processors may be configured to transmit, based at least in part on the transmit configuration, a second communication during at least a portion of a second time interval of the uplink transmission interval configuration, wherein the transmit configuration indicates the first number of bytes based at least in part on the first communication being associated with the first priority level and a second number of bytes based at least in part on the second communication being associated with a second priority level.

Some aspects described herein relate to a non-transitory computer-readable medium that stores a set of instructions for wireless communication by a UE. The set of instructions, when executed by one or more processors of the UE, may cause the UE to transmit, based at least in part on a transmit configuration, a first communication associated with at least a portion of a first time interval of an uplink transmission interval configuration, wherein the first communication is associated with a first priority level and a first number of bytes. The set of instructions, when executed by one or more processors of the UE, may cause the UE to transmit, based at least in part on the transmit configuration, a second communication during at least a portion of a second time interval of the uplink transmission interval configuration, wherein the transmit configuration indicates the first number of bytes based at least in part on the first communication being associated with the first priority level and a second number of bytes based at least in part on the second communication being associated with a second priority level.

Some aspects described herein relate to an apparatus for wireless communication. The apparatus may include means for transmitting, based at least in part on a transmit configuration, a first communication associated with at least a portion of a first time interval of an uplink transmission interval configuration, wherein the first communication is associated with a first priority level and a first number of bytes. The apparatus may include means for transmitting, based at least in part on the transmit configuration, a second communication during at least a portion of a second time interval of the uplink transmission interval configuration, wherein the transmit configuration indicates the first number of bytes based at least in part on the first communication being associated with the first priority level and a second number of bytes based at least in part on the second communication being associated with a second priority level.

In some aspects, a method of wireless communication performed by a user equipment (UE) includes transmitting, based at least in part on a transmit configuration, a first communication associated with at least a portion of an ON duration of an uplink transmission interval configuration, wherein the first communication is associated with a first group of logical channels and a first number of bytes; and transmitting, based at least in part on the transmit configuration, a second communication during at least a portion of an OFF duration of the uplink transmission interval configuration, wherein the transmit configuration indicates the first number of bytes based at least in part on the first communication being associated with the first group of logical channels and the second number of bytes based at least in part on the second communication being associated with a second group of logical channels.

In some aspects, the method includes determining the transmit configuration based at least in part on an expected payload associated with the second communication.

In some aspects, the method includes determining the transmit configuration based at least in part on a combination of expected payloads associated with each logical channel of the second group of logical channels.

In some aspects, the report of the first number of bytes is a buffer status report associated with the first communication, wherein the buffer status report indicates a diminished buffer status based at least in part on the second number of bytes.

In some aspects, the first number of bytes is based at least in part on reserving an amount of energy for signaling of a control channel or a reference signal.

In some aspects, the second group of logical channels is not subject to the uplink transmission interval configuration.

In some aspects, the second group of logical channels is associated with at least one of: Voice over Internet Protocol traffic, video telephony traffic, a signaling radio bearer, or default bearer priority queue traffic.

In some aspects, the second group of logical channels is associated with a higher priority level than the first group of logical channels.

In some aspects, the second communication is transmitted using a power level based at least in part on the transmit configuration irrespective of whether the second communication is transmitted during the ON duration or the OFF duration.

In some aspects, the report of the first number of bytes is a buffer status report associated with the first communication associated with the first group of logical channels, and the buffer status report indicates a zero buffer status.

In some aspects, the first number of bytes is based at least in part on an average throughput associated with the first group of logical channels and the second number of bytes is based at least in part on an average throughput associated with the second group of logical channels.

In some aspects, the uplink transmission interval configuration is a thermal transmission configuration.

In some aspects, the uplink transmission interval configuration is a duty cycle based physical uplink shared channel transmission configuration.

In some aspects, the method includes determining the second group of logical channels.

In some aspects, the method includes determining that the uplink transmission interval configuration is in use, wherein the second number of bytes is reserved based at least in part on the uplink transmission interval configuration being in use.

In some aspects, a user equipment (UE) for wireless communication includes a memory; and one or more processors coupled to the memory, the memory and the one or more processors configured to: transmit, based at least in part on a transmit configuration, a first communication associated with at least a portion of an ON duration of an uplink transmission configuration, wherein the first communication is associated with a first group of logical channels and a first number of bytes; and transmit, based at least in part on the transmit configuration, a second communication during at least a portion of an OFF duration of the uplink transmission interval configuration, wherein the transmit configuration indicates the first number of bytes based at least in part on the first communication being associated with the first group of logical channels and the second number of bytes based at least in part on the second communication being associated with a second group of logical channels In some aspects, a non-transitory computer-readable medium storing a set of instructions for wireless communication includes one or more instructions that, when executed by one or more processors of a user equipment (UE), cause the UE to: transmit, based at least in part on a transmit configuration, a first communication associated with at least a portion of an ON duration of an uplink transmission configuration, wherein the first communication is associated with a first group of logical channels and a first number of bytes; and transmit, based at least in part on the transmit configuration, a second communication during at least a portion of an OFF duration of the uplink transmission interval configuration, wherein the transmit configuration indicates the first number of bytes based at least in part on the first communication being associated with the first group of logical channels and the second number of bytes based at least in part on the second communication being associated with a second group of logical channels In some aspects, a method of wireless communication performed by a user equipment (UE) includes transmitting, based at least in part on a transmit power configuration, a first communication associated with a first group of logical channels associated with at least a portion of an ON duration of an uplink transmission interval configuration; and transmitting, based at least in part on the transmit power configuration, a second communication during at least a portion of an OFF duration of the uplink transmission interval configuration, wherein the transmit power configuration indicates a first amount of energy for the first communication based at least in part on the first communication being associated with the first group of logical channels and a second amount of energy for the second communication based at least in part on the second communication being associated with a second group of logical channels.

In some aspects, the method includes determining the transmit power configuration based at least in part on an expected payload associated with the second communication.

In some aspects, the method includes determining the transmit power configuration based at least in part on a combination of expected payloads associated with each logical channel of the second group of logical channels.

In some aspects, an expected payload, of the expected payloads, is based at least in part on at least one of: historical information regarding a payload associated with a logical channel corresponding to the expected payload, or information regarding a service associated with the expected payload.

In some aspects, the method includes transmitting a buffer status report associated with the first communication, wherein the buffer status report indicates a diminished buffer status based at least in part on the second amount of energy.

In some aspects, the diminished buffer status is determined based at least in part on a target modulation and coding scheme for the second communication.

In some aspects, the diminished buffer status is determined based at least in part on a target block error rate for the second communication.

In some aspects, the diminished buffer status is determined based at least in part on a maximum number of bytes associated with the second communication and a maximum number of bytes associated with the first communication.

In some aspects, the first amount of energy is based at least in part on reserving an amount of energy for signaling of a control channel or a reference signal.

In some aspects, the second group of logical channels is not subject to the uplink transmission interval configuration.

In some aspects, the second group of logical channels is associated with at least one of: Voice over Internet Protocol traffic, video telephony traffic, a signaling radio bearer, or default bearer priority queue traffic.

In some aspects, the second group of logical channels is associated with a higher priority level than the first group of logical channels.

In some aspects, the second communication is transmitted using a power level indicated by the transmit power configuration irrespective of whether the second communication is transmitted during the ON duration or the OFF duration.

In some aspects, the first amount of energy is based at least in part on an average throughput associated with the first group of logical channels and the second amount of energy is based at least in part on an average throughput associated with the second group of logical channels.

In some aspects, the uplink transmission interval configuration is a thermal transmission configuration.

In some aspects, the uplink transmission interval configuration is a duty cycle based physical uplink shared channel transmission configuration.

In some aspects, the method includes determining the second group of logical channels.

In some aspects, the method includes determining that the uplink transmission interval configuration is in use, wherein the second amount of energy is reserved based at least in part on the uplink transmission interval configuration being in use.

In some aspects, a user equipment (UE) for wireless communication includes a memory; and one or more processors coupled to the memory, the memory and the one or more processors configured to: transmit, based at least in part on a transmit power configuration, a first communication associated with a first group of logical channels associated with at least a portion of an ON duration of an uplink transmission interval configuration; and transmit, based at least in part on the transmit power configuration, a second communication during at least a portion of an OFF duration of the uplink transmission interval configuration, wherein the transmit power configuration indicates a first amount of energy for the first communication based at least in part on the first communication being associated with the first group of logical channels and a second amount of energy for the second communication based at least in part on the second communication being associated with a second group of logical channels.

In some aspects, a non-transitory computer-readable medium storing a set of instructions for wireless communication includes one or more instructions that, when executed by one or more processors of a user equipment (UE), cause the UE to: transmit, based at least in part on a transmit power configuration, a first communication associated with a first group of logical channels associated with at least a portion of an ON duration of an uplink transmission interval configuration; and transmit, based at least in part on the transmit power configuration, a second communication during at least a portion of an OFF duration of the uplink transmission interval configuration, wherein the transmit power configuration indicates a first amount of energy for the first communication based at least in part on the first communication being associated with the first group of logical channels and a second amount of energy for the second communication based at least in part on the second communication being associated with a second group of logical channels.

In some aspects, an apparatus for wireless communication includes means for transmitting, based at least in part on a transmit power configuration, a first communication associated with a first group of logical channels associated with at least a portion of an ON duration of an uplink transmission interval configuration; and means for transmitting, based at least in part on the transmit power configuration, a second communication during at least a portion of an OFF duration of the uplink transmission interval configuration, wherein the transmit power configuration indicates a first amount of energy for the first communication based at least in part on the first communication being associated with the first group of logical channels and a second amount of energy for the second communication based at least in part on the second communication being associated with a second group of logical channels.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
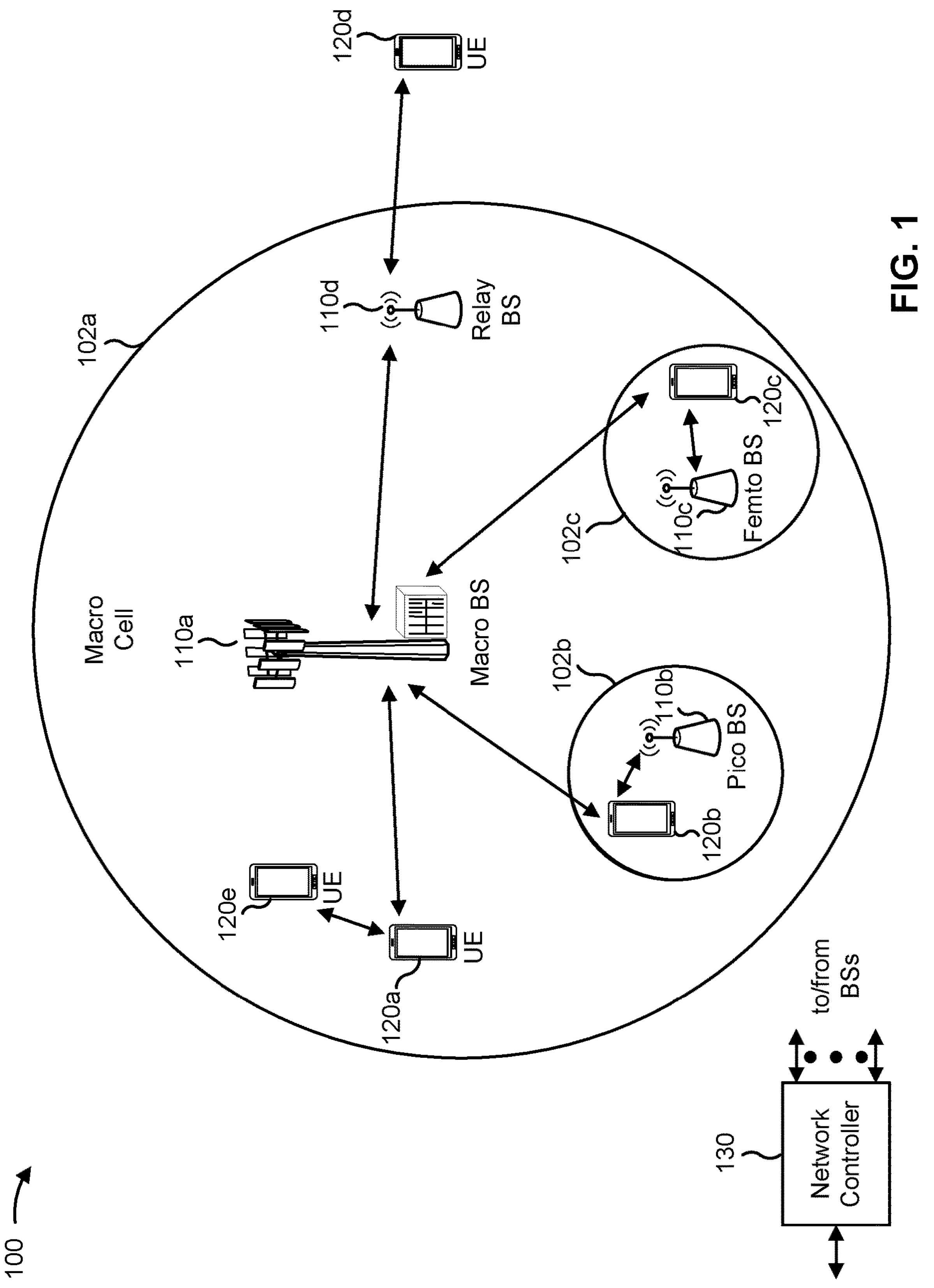
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
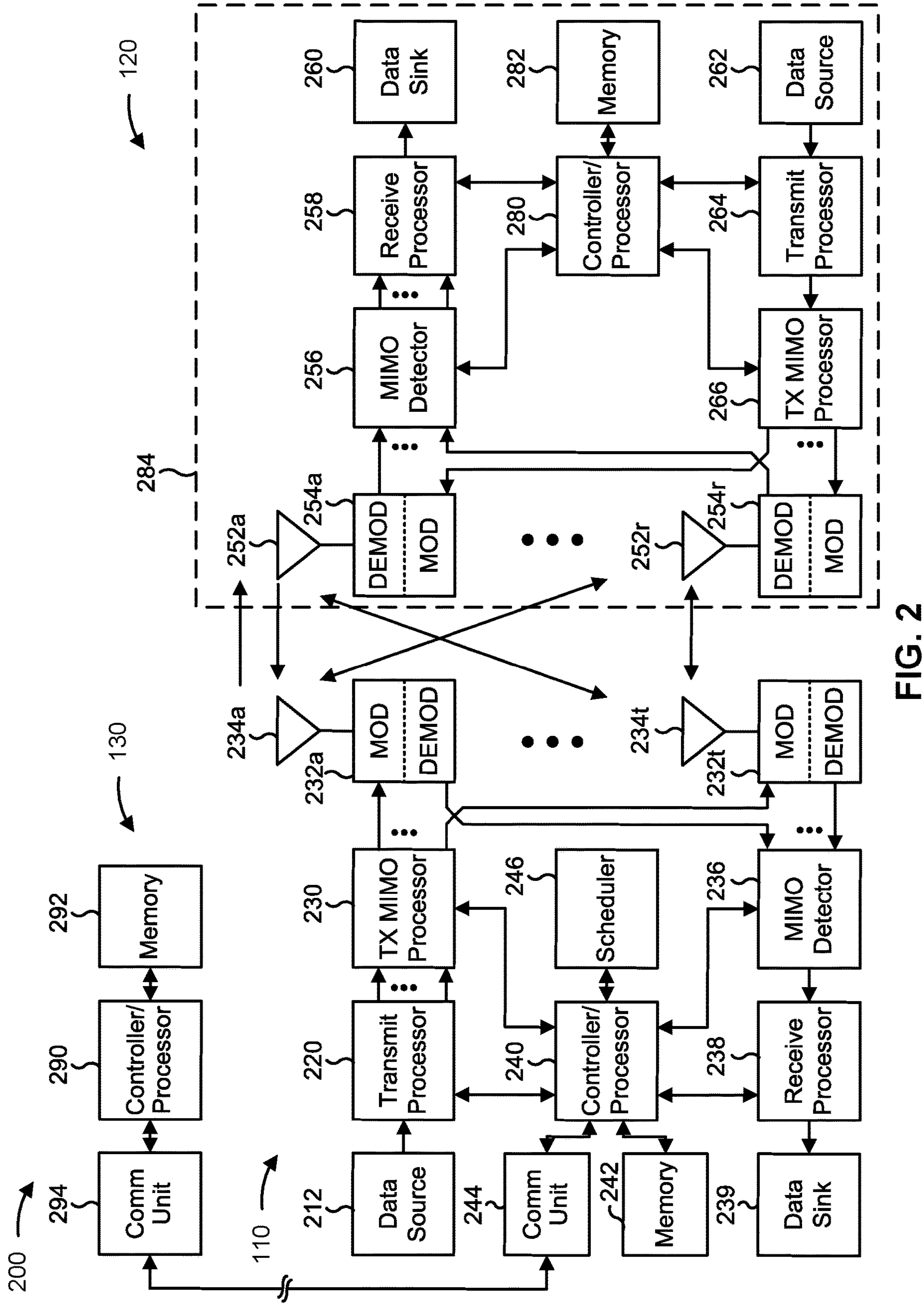
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with uplink quality of service (QoS) management for shared channel transmission, as described in more detail elsewhere herein. For example, controller/processor 240 of base station 110, controller/processor 280 of UE 120, and/or any other component(s) of FIG. 2 may perform or direct operations of, for example, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, and/or other processes as described herein. In some aspects, executing instructions may include running the instructions, converting the instructions, compiling the instructions, and/or interpreting the instructions.

As indicated above, FIG. 2 is provided as an example. Other examples may differ from what is described with regard to FIG. 2.

A wireless communication device, such as a UE, may be subject to certain limitations on transmit power of the wireless communication device. For example, a regulatory body may impose limits on exposure rate of a user of a UE, absorption rate of a user of the UE, or the like, so that the user is not subjected to untenable amounts of radiated power from the UE. One example of a limit is defined by a specific absorption rate (SAR). SAR is a measurement of the rate (e.g., amount per unit mass) at which radio frequency (RF) electromagnetic field energy is absorbed by the human body. The Federal Communications Commission (FCC) and other regulatory entities have placed limitations on SAR, with which UEs subject to these limitations must comply. Examples of such limitations include 1.6 milliwatts per gram (mW/g) of human tissue (as specified by the FCC) and 2.0 mW/g per 10-grams of human tissue for the European Union (EU) and many other countries who follow the International Commission for Non-Ionizing Radiation Protection (ICNIRP). Another example of a limit is defined by a maximum permissible exposure (MPE). MPE refers to the highest power or power density (PD) (expressed in watts per square centimeter or joules per square centimeter) allowed for the radiation source (e.g., the UE) to be considered safe. Some SAR/MPE limitations may be metered on a time-averaged basis, meaning that an average transmit power (e.g., power density, energy level) of communications of the UE in a time window must satisfy the SAR/MPE limitation.

Accordingly, different metrics may be used to assess RF exposure for different wireless communication technologies. UEs generally must satisfy all applicable RF exposure limits (e.g., SAR exposure limits or PD (e.g., MPE) exposure limits), which are typically regulatory requirements that are defined in terms of aggregate exposure over a certain amount of time, and the aggregate exposure may be averaged over a moving integration window (or moving time window), sometimes referred to as a compliance window. Some RF exposure limits, such as SAR exposure limits and PD exposure limits, can be expressed in terms of energy. For example, an RF exposure limit can indicate an amount of radiated or absorbed energy that is permissible within a time window. This amount of energy can be used to identify power limits for UEs, as described below.

A UE may be subject to an average power limit (Pima) that corresponds to an average power at which an SAR exposure limit and/or an MPE (e.g., PD) limit is satisfied if the UE were to transmit substantially continuously over a moving integration window of N seconds (e.g., 100 seconds). Accordingly, the UE can use an instantaneous transmit power that exceeds the average power limit for a period of time provided that the average power over the moving integration window is under the average power limit at which the MPE limit is satisfied. For example, the UE may transmit at a maximum transmit power at the start of the moving integration window, and then reduce the instantaneous transmit power until the moving integration window ends, to ensure that the MPE limit on aggregate exposure (which may be expressed in terms of energy) is satisfied over the entire moving integration window. In general the UE may reduce the instantaneous transmit power to a reserve power level (Preserve), which is a minimum transmit power level to maintain a link with a base station.

A wireless communication device (e.g., UE 120) may simultaneously transmit signals using multiple wireless communication technologies. For example, the wireless communication device may simultaneously transmit signals using a first wireless communication technology operating at or below 6 GHz (e.g., 3G, 4G, sub-6 GHz frequency bands of 5G, etc.) and a second wireless communication technology operating above 6 GHz (e.g., mmWave bands of 5G in 24 to 60 GHz bands, IEEE 802.11ad or 802.11ay). In certain cases, the wireless communication device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD. By way of example, a UE may include multiple radios, modules, and/or antennas (referred to collectively herein simply as radios for convenience) corresponding to multiple RATs and/or frequency bands, which may be more readily understood with reference to FIG. 4. Since the UE is required to satisfy all applicable RF exposure parameters, the UE may be subject to both SAR and MPE limitations, or may be subject to different RF exposure parameters for different radios, modules, or antenna bands, as described elsewhere herein.

In some cases, a UE may include multiple radios corresponding to multiple RATs and/or frequency bands. For example, the UE may be capable of communicating using various RATs, such as 2G, 3G, 4G, 4G LTE, 5G NR, 6G, Wi-Fi, Bluetooth, IEEE 802.11ad, and/or 802.11ay. Additionally, or alternatively, the UE may be capable of communication on various frequency bands within a RAT (e.g., FR1, FR2, FR3, FR4a, FR4-1, FR4, and/or FR5). Additionally, or alternatively, in some aspects the UE may be capable of operating in modes in addition to those described in detail above including, for example, an uplink carrier aggregation (UL CA) mode, a dual SIM dual active (DSDA) mode, a WiFi plus wide-area network (WAN) mode, and the like. For each RAT and/or frequency band, the UE may include a corresponding radio configured to communicate on that RAT and/or frequency band. Moreover, in some cases, a UE may be configured to communicate using two or more radios concurrently. For example, a UE may communicate over 5G NR while simultaneously communicating via Bluetooth or a similar RAT. As another example, the UE may communicate using multiple component carriers, such as via one or more component carriers using a first radio and via one or more other component carriers using a second radio. In such instances, each individual radio may use a certain level of allocated power to transmit communications, and collectively the transmitting radios must satisfy any applicable SAR exposure and/or MPE (e.g., PD) limitations. Thus, the techniques described herein provide power control for a plurality of communication links. A communication link can be associated with a radio, a RAT, a master cell group (MCG) link or a secondary cell group (SCG) link of a dual connectivity mode, a component carrier, a combination thereof, or the like. For example, the techniques defined herein may provide power control for a first radio using a first RAT, a second radio using a second RAT, a third radio associated with a first component carrier of a given RAT, a fourth radio associated with a second component carrier of the given RAT, and so on. In some aspects, a pair of communication links and/or radios may be implemented using any of the dual connectivity and/or multi-radio modes described above.

When a UE is transmitting using more than one radio, the SAR and/or MPE contributions from each radio must collectively remain under the applicable SAR and/or MPE limits. Accordingly, for a given transmission timeframe or compliance window, a UE may allocate a portion of the total energy available for transmission (e.g., the total energy that can be utilized by the UE while remaining under the applicable SAR and/or MPE limits for the transmission timeframe) to each radio such that, collectively, the radios will not exceed the applicable SAR and/or MPE limits. Put another way, for given SAR exposure and PD limits (e.g., represented as $SAR_{lim}$ and $PD_{lim}$), the sum of the normalized SAR exposure and/or PD contributions of each radio (e.g., the SAR exposures and/or PD contribution of the radio, represented as $SAR_i$ and/or $PD_i$, divided by the applicable SAR exposure and/or PD limit, represented as $SAR_{lim}$ and/or $PD_{lim}$) must be less than or equal to one. Assuming that SAR exposure limits are applicable to radios operating in frequency bands below 6 GHz, and that MPE (e.g., PD) limits are applicable to radios operating in frequency bands above 6 GHz, the applicable SAR exposure and/or PD limits can be summarized as shown in the following equation:

$$\sum_{i=100\,kHz}^{6\,GHz} \frac{SAR_i}{SAR_{lim}} + \sum_{i=6\,GHz}^{300\,GHz} \frac{PD_i}{PD_{lim}} \leq 1.$$

To maintain power output of a UE such that the UE satisfies the above condition, a total transmission energy available to the UE for a given transmission timeframe or compliance window is allocated among the various radios so that, if the radios transmit simultaneously, the collective power output remains under the applicable SAR exposure and/or MPE (e.g., PD) limits.

Figure 3:
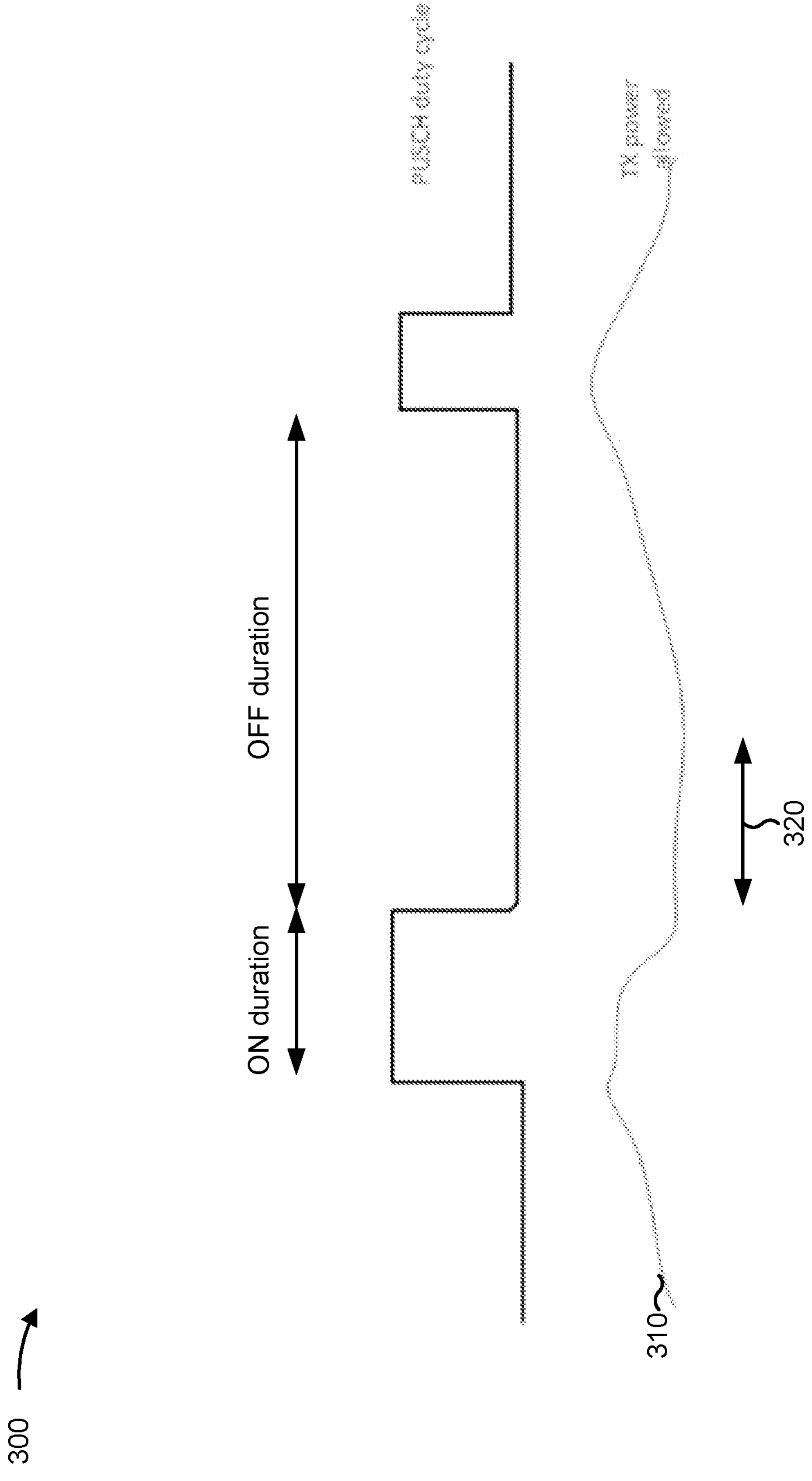
FIG. 3 is a diagram illustrating an example of a duty cycle based physical uplink shared channel transmission configuration, in accordance with the present disclosure.

A UE may implement an uplink transmission interval configuration to ensure compliance with SAR/MPE limitations. Generally, an uplink transmission interval configuration may configure the UE to perform transmissions in a fashion that does not violate SAR/MPE limitations. One example of an uplink transmission interval configuration is a duty cycle based physical uplink shared channel (PUSCH) transmission configuration. FIG. 3 is a diagram illustrating an example 300 of a duty cycle based PUSCH transmission configuration. As shown, a duty cycle based PUSCH transmission configuration may be associated with ON durations and OFF durations of a duty cycle. The UE may refrain from transmitting a communication in an OFF duration and may transmit the communication only in an ON duration. This may enable the UE to transmit at high power, and close the communication link during a period of time, and avoid transmitting the rest of the time, to lower the averaged power and meet the regulatory requirements. Another example of an uplink transmission interval configuration is a thermal throttling configuration, in which the UE may increase or decrease transmission power and/or an amount of data transmitted based at least in part on a thermal status of the UE.

In some cases, a UE may transmit multiple different communications associated with different types of traffic. For example, a UE may use services associated with different logical channels (LCHs) or radio bearers. A logical channel is a service provided by a medium access control (MAC) layer to a radio link control (RLC) layer. A logical channel may be defined by the type of information carried. Examples of logical channels include broadcast control channels, paging control channels, common control channels, dedicated control channels, and dedicated traffic channels. Examples of services and traffic that can be associated with an LCH include Voice over Internet Protocol (VoIP) traffic, video telephony (VT) traffic, a signaling radio bearer (SRB), default bearer traffic (e.g., internet traffic). The UE implementation may segregate traffic within one LCH, into two or more priority queues, with may be referred to as Normal and Priority levels. The priority queue associated with the Priority level may be used for time sensitive traffic such as Transmission Control Protocol (TCP) Acks, Gaming, Facetime® or another over-the-top telephony or video calling service, gaming traffic, or the like. It should be noted that the techniques described herein are not limited to those involving grouping of logical channels, and can be implemented for other forms of grouping, such as based at least in part on priority levels of traffic, bearers, or services.

In some cases, a UE implementing an uplink transmission interval configuration (such as a duty cycle based PUSCH transmission configuration), may encounter issues with available power for transmission of multiple different communications associated with different LCHs, priority levels, or the like. For example, in a case with a first communication associated with a first LCH and a second communication associated with a second LCH, the first communication may be associated with a duty cycle based PUSCH transmission configuration, such that the first communication is transmitted only in ON durations of the duty cycle. If the UE uses a significant portion of the UE's power (regulated) budget, then the UE may not have sufficient remaining power budget for a communication associated with the second LCH. For example, reference number 310 shows an example of a permitted transmit power. It can be seen that the permitted transmit power peaks during the ON durations, and decreases after the ON duration ends. This decrease may lead to insufficient power budget, for example, in the time period shown by reference number 320. The insufficient power budget may be particularly problematic for session-based or real time communications (e.g., VoIP, VT, SRB, Facetime®, and so on), which may experience power budget issues during the OFF duration of the cycle in such a case. Such power budget issues may lead to failed transmission, delayed transmission, dropped calls, impacted user experience, and so on. Further complexity arises when the UE is associated with multiple energy budgets (such as associated with different MPE or SAR requirements, different frequency bands, different radios, and so on) and/or multiple communication links (such as multiple radios).

Some techniques and apparatuses described herein provide transmission of communications associated with multiple different LCHs (or multiple priority levels, or the like) in compliance with MPE/SAR restrictions. For example, a UE may determine a first amount of power for a first communication associated with a first LCH (or priority level) and a second amount of power for a second communication associated with a second LCH (or priority level). The second LCH may be associated with a group of LCHs termed "high-priority LCHs," and the first LCH may be lower priority and be associated with a group of LCHs that are subject to the duty cycle based PUSCH transmission configuration. Some techniques and apparatuses described herein provide for an amount of energy to be reserved for the second communication such that the second communication can be transmitted without delay and with the necessary power (e.g., such that the first communication leaves sufficient power budget for the second communication can be performed within an ON duration or an OFF duration of the duty cycle based PUSCH transmission configuration). For example, the UE may report amounts of bytes for the first communication and the second communication based at least in part on the reserved amount of energy, and/or may include amounts of bytes for the first communication and the second communication based at least in part on the reserved amount of energy. Furthermore, some techniques and apparatuses described herein provide buffer status determination and reporting for UEs associated with multiple energy budgets and/or multiple communication links, as described in more detail in connection with FIGS. 8-12. In this way, the occurrence of failed transmission, delayed transmission, and dropped calls is reduced for the second communication, which improves throughput, improves communication resource utilization, and improves user experience.

FIG. 3 is provided as an example. Other examples may differ from what is described with regard to FIG. 3.

Figure 4:
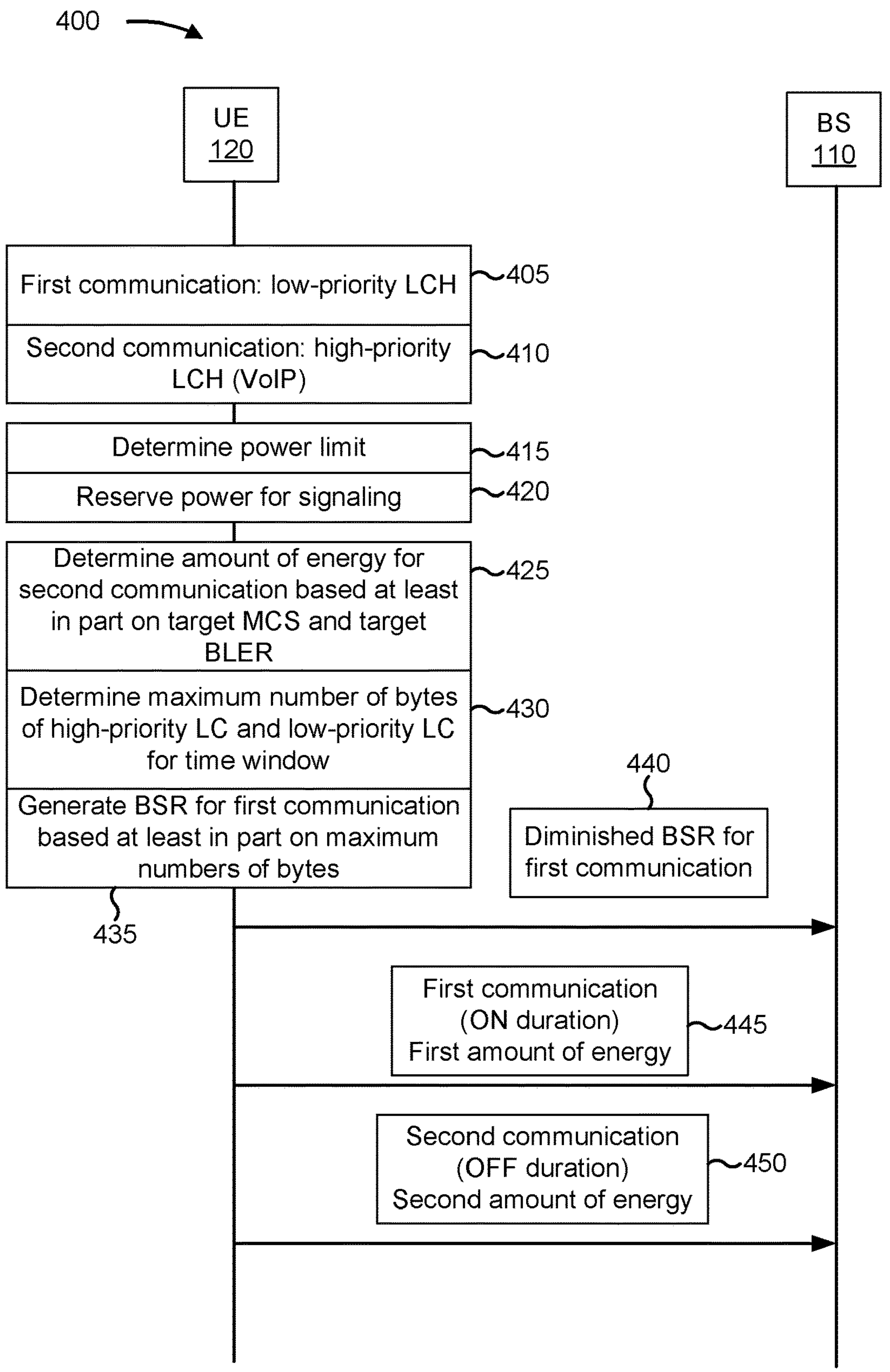
FIG. 4 is a diagram illustrating an example of determination of a transmit power configuration for multiple communications associated with different logical channels, in accordance with the present disclosure.

FIG. 4 is a diagram illustrating an example 400 of determination of a transmit configuration for multiple communications associated with different logical channels, in accordance with the present disclosure. As shown, example 400 includes a UE 120 and a BS 110.

Example 400 relates to transmission by the UE 120 of a first communication (as shown by reference number 405) and a second communication (as shown by reference number 410). The first communication and the second communication may be associated with respective LCHs. For example, the first communication may be associated with an LCH belonging to a first group of LCHs (shown as a low-priority LCH) and the second communication may be associated with an LCH belonging to a second group of LCH (shown as a high-priority LCH). In some aspects, the first group of LCHs may be subject to a duty cycle based PUSCH transmission configuration. In some aspects, the second group of LCHs may not be subject to a duty cycle based PUSCH transmission configuration. While example 400 is described with regard to a single first communication and a single second communication, the techniques described in example 400 can be applied for any number of communications associated with any number of LCHs belonging to the first group of LCHs and any number of communications associated with any number of LCHs belonging to the second group of LCHs. Furthermore, it should be understood that "first communication" and "second communication" can refer to discrete communications or continuous communications (e.g., ongoing transmissions, transmissions comprising multiple packets, and so on). In some cases the traffic within a LCH can be split into low priority and high priority. As used herein, "high-priority LCH" can refer to traffic associated with a high priority queue from an LCH that is split into a low priority queue and a high priority queue, and "low-priority LCH" can refer to traffic associated with a low priority queue from an LCH that is split into a low priority queue and a high priority queue. Thus, the first group of LCHs can include one or more high-priority LCHs and/or traffic associated with a high priority queue from an LCH that is split into a low priority queue and a high priority queue, and the second group of LCHs can include one or more low-priority LCHs and/or traffic associated with a low priority queue from an LCH that is split into a low priority queue and a high priority queue.

As shown, the high-priority LCH may be associated with a VoIP service. In some aspects, the UE 120 may determine whether a LCH belongs to the first group of LCHs (e.g., the low-priority LCH) or the second group of logical channels (e.g., the high-priority LCHs) based at least in part on the priority indicated by the Radio Resource Control configuration, or an indication from the host. For example, the UE 120 may determine a set of high-priority LCHs. In some aspects, the application or host may mark some priority traffic, within a low priority LCH, for the UE to handle as priority LCH. In some aspects, the UE 120 may determine that an LCH is a high-priority LCH based at least in part on a service or traffic associated with the LCH. For example, if the LCH is associated with a particular service or traffic type (e.g., VoIP, VT, SRBs, a default bearer priority queue such as TCP Acks, Facetime or other over-the-top call traffic, gaming, or the like), the UE 120 may determine that the LCH is a high-priority LCH. In some aspects, the UE 120 may receive information indicating which services or traffic types are associated with high-priority LCHs, which LCHs are to be considered high-priority LCHs, or the like. "Priority LCH" is used interchangeably with "High-priority LCH" herein.

As shown by reference number 415, the UE 120 may determine a power limit. A power limit may indicate a maximum power that the UE 120 can transmit in a time interval. The power limit may be used to implement a transmit configuration of the UE 120. For example, the UE 120 may determine an amount of power for the first communication and/or the second communication, an amount of bytes to be included in the first communication and/or the second condition, and/or an amount of bytes to report for the first communication and/or the second communication, based at least in part on the power limit. One example of a transmit configuration is a transmit power configuration, which can be used to limit a UE's transmitted energy in compliance with SAR/MPE limitations.

In some aspects, the UE 120 may determine the power limit based at least in part on configuration information. In some aspects, the UE 120 may determine the power limit based at least in part on an MPE/SAR limitation. In some aspects, the UE 120 may determine the power limit based at least in part on transmitted power of the UE 120 in a window (e.g., a historical window), or based at least in part on the distance to the body tissue. In some aspects, the UE 120 may determine the power limit based at least in part on determining that the UE 120 is to simultaneously transmit communications associated with the low-priority group of LCHs and the high-priority group of LCHs.

As shown by reference number 420, in some aspects, the UE 120 may reserve power for physical layer signaling by the UE 120. For example, some uplink communications may be useful for network operations, such as a physical uplink control channel (PUCCH) that carries hybrid automatic repeat request (HARQ) feedback, a sounding reference signal (SRS) or another form of channel or signal. In some aspects, the UE 120 may determine a reserved amount of power so that such communications can be transmitted by the UE 120 irrespective of power management for the first communication and the second communication. In some aspects, the UE 120 may determine the reserved amount of power based at least in part on a transmit power needed for an uplink communication, a number of symbols of the uplink communication, a number of subframes in which the uplink communication is to be transmitted, a duty cycle for the uplink communication, or the like. Such parameters can be signaled to the UE 120 or determined by the UE 120. In some aspects, the UE 120 may modify a first amount of energy permitted for the first communication based at least in part on the reserved amount of power. For example, the UE 120 may decrease the first amount of energy permitted for the first communication so that the reserved amount of power is available for transmission of an uplink communication, such as a PUCCH, an SRS, or the like. In some aspects, the UE 120 may consider power used by another technology (for example, if NR and LTE are to share power) in order to determine the first amount of energy and the second amount of energy.

As shown by reference number 425, the UE 120 may determine an amount of energy for the second communication. The amount of energy for the second communication is referred to herein as a second amount of energy. In some aspects, the UE 120 may determine the amount of energy for the second communication based at least in part on a target modulation and coding scheme (MC S) for the second communication, a target block error rate (BLER) for the second communication, or the like, as described in more detail below. The first and second communication may occur over the PUSCH. As also described in more detail below, the UE 120 may modify a buffer status report (BSR) associated with the first communication such that the second amount of energy is reserved for transmission of the second communication.

In some aspects, the UE 120 may determine the amount of energy for the second communication based at least in part on a target MCS. The target MCS may represent a desired minimum MCS that the UE 120 intends to sustain in a time window. Additionally, or alternatively, the UE 120 may determine the amount of energy for the second communication based at least in part on a target BLER. The target BLER may represent a desired minimum BLER that the UE 120 intends to sustain in a time window. For example, the target MCS and/or the target BLER may be selected such that the second communication is expected to be successful with a threshold probability if the target MCS and/or the target BLER are satisfied. In some aspects, the UE 120 may determine a signal-to-noise ratio (SNR) based at least in part on the target MCS and/or the target BLER, and may use the SNR to determine a maximum supportable number of resource blocks (RBs) which the UE 120 can sustain in a time window. Then, the UE 120 may use the maximum supportable number of RBs to determine whether a transmit configuration is to throttle uplink transmit power of the UE 120. For example, if the maximum supportable number of RBs is greater than or equal to a maximum allocatable number of RBs in an uplink grant, then the UE 120 may not need to throttle uplink transmit power of the UE 120 (since the UE 120 can transmit the maximum allocatable number of RBs without exceeding the power limit). If the maximum supportable number of RBs is lesser than the maximum allocatable number of RBs in an uplink grant, then the UE 120 may throttle uplink transmit power of the UE 120 (since the UE 120 could receive a grant with more RBs than can be transmitted by the UE 120 without exceeding the power limit).

As shown by reference number 430, the UE 120 may determine an expected number of bytes associated with the first communication and an expected number of bytes associated with the second communication. For example, the UE 120 may determine an expected payload of the first communication and an expected payload of the second communication. In some aspects, the UE 120 may determine an expected payload for each of the high-priority group of LCHs, and may determine a combination (e.g., a sum) of the expected payloads of the high-priority group of LCHs. In some aspects, the UE 120 may determine an expected payload based at least in part on historical information regarding a payload associated with an LCH, information regarding a service associated with the expected payload (e.g., a voice or video codec rate associated with a call, information provided by an IP Multimedia Subsystem (IMS) stack, information provided by an operating system or an application associated with the LCH), a modem configuration of the UE 120 (e.g., based at least in part on a throughput of the modem, a transport block size supported by the modem, a bandwidth throttling configuration of the modem), or the like.

In some aspects, the UE 120 may determine a maximum number of bytes that can be transmitted in a time window (e.g., for all communications). For example, the UE 120 may determine the maximum number of bytes based at least in part on a target MCS, a duty cycle of the UE 120, a maximum supportable number of RBs in the time window, or the like.

In some aspects, the UE 120 may determine a maximum number of bytes (e.g., an expected payload) for the second communication in a time window. For example, the UE 120 may determine the maximum number of bytes for the second communication based at least in part on a periodicity associated with the second communication (e.g., a time period between transmissions of packets of the second communication), a unit size of the second communication (e.g., how many bytes are in a given packet of the second communication), a number of packets of the second communication, and/or other information associated with the second communication.

In some aspects, the UE 120 may determine a maximum number of bytes allowed for the first communication to transmit. For example, the UE 120 may subtract, from the maximum number of bytes that can be transmitted in the time window, the maximum number of bytes for the second communication in the time window. Thus, the UE 120 may determine an adjusted size for the first communication. The UE may limit the amount of bytes transmitted for the first communication according to the maximum number of bytes allowed for the first communication. The UE may reduce the BSR for the LC in the first communication, the UE may skip PUSCH transmissions, the UE may perform PUSCH transmissions with a reduced power, as described below.

As shown by reference number 435, the UE 120 may generate a BSR to report traffic for first and second communication. For example, the UE 120 may generate the BSR based at least in part on the respective current buffer level and respective expected payloads of the first communication and the second communication. For example, the determination of the buffer status may be based at least in part on:

buffer report for first communication=min (actual buffer for first communication, total bytes allowed—bytes expected for second communication). More particularly, the UE 120 may subtract a second number of bytes (e.g., an expected payload) of the second communication from an expected payload of the first communication to determine a first number of bytes for the first communication, so that the BSR reflects a diminished buffer status, thereby enabling the UE 120 to reserve an appropriate amount of energy for transmission of the second communication. In some aspects, if the diminished buffer status is greater than an actual buffer status of the UE 120, then the UE 120 may transmit a BSR indicating the actual buffer status. The UE keeps reporting diminished buffer in future BSRs, which can be sent periodically. When the allowed bytes is zero, UE reports zero buffer for this first communication.

In some aspects, the UE 120 may generate the BSR based at least in part on a time window. For example, if part of the time window has elapsed, the UE 120 may determine an amount of data transmitted in the elapsed part of the time window, and may adjust the BSR so that the amount of data transmitted for the first and second communication in the elapsed part of the time window is accounted for. Thus, the UE 120 may ensure that the power limit is not exceeded.

In some aspects, the UE 120 may update a diminished buffer status or a determination of whether throttling is required. For example, the UE 120 may update the diminished buffer status or the determination of whether throttling is required (e.g., the determination of whether the UE 120 should perform the operations described in connection with FIG. 4) based at least in part on a configuration or deconfiguration of an uplink component carrier (CC), an activation or deactivation of an uplink CC, a change of a duty cycle of the UE (e.g., associated with the duty cycle based PUSCH transmission configuration), or the like.

As shown by reference number 440, the UE 120 may transmit the BSR associated with the first communication and indicating the diminished buffer size (e.g., the first number of bytes). The UE 120 may receive a grant, from the BS 110, based at least in part on the BSR (not shown). The grant may provide an uplink grant including a number of RBs in conformance with the diminished buffer size (e.g., the first number bytes). For example, the number of RBs may be configured such that the UE 120 does not exceed the power limit and such that the UE 120 reserves the amount of energy for the second communication (e.g., based at least in part on the second number of bytes). In some aspects, the grant may be associated with a shortened ON duration of a duty cycle based PUSCH transmission configuration. The UE 120 may keep a counter of bytes allowed for the first communication (e.g., at all times). An initial value of the counter may be defined as (total bytes allowed—bytes expected for second communication). The counter may be decremented by the number of bytes transmitted for the first communication in each PUSCH. If the size of a PUSCH grant exceeds a current value of the counter, or if no traffic from the second communication is included in the PUSCH transport block, the UE 120 may skip the transmission on the PUSCH grant. Thus, the first communication does not spend power over budget.

some aspects, the first communication may be transmitted using a diminished transmit power relative to a transmit power that does not take into account the second communication's energy. Thus, the amount of energy used to transmit the first communication may be decreased, whether by shortening the ON duration, reducing the size of the uplink grant, reducing the transmit power of the first communication, or some combination thereof. As shown by reference number 445, the UE 120 may transmit the first communication in an ON duration using (at most) the first amount of energy, where the first amount of energy takes into account the second amount of energy associated with the second communication.

As shown by reference number 450, the UE 120 may transmit the second communication. In some aspects, the second communication may include at most the second number of bytes, and may be transmitted with at most the second amount of energy. In example 400, the second communication is transmitted in the OFF duration, though the second communication can be transmitted in an ON duration and/or in an OFF duration. In some aspects, the UE 120 may transmit a BSR for the second communication. For example, the BSR may indicate a buffer status corresponding to the actual number of bytes of the second communication. The BSR for the first communication may be zero during the OFF duration. The UE 120 may receive, from the BS 110, an uplink grant based at least in part on the BSR associated with the first and second communication. The UE 120 may transmit the second communication on the uplink grant. In this way, the occurrence of failed transmission, delayed transmission, and dropped calls is reduced for the second communication, which improves throughput, improves communication resource utilization, and improves user experience.

In some aspects, example 400 can be implemented via throttling the low-priority group of LCHs to an average rate. For example, the UE 120 may determine that the UE 120 can support a total throughput of R. The UE 120 may determine that a high-priority group of LCHs are associated with a throughput of Rq. Thus, the UE 120 may determine that at least Rq throughput should be reserved for the high-priority group of LCHs. The UE 120 may use an uplink transmission interval configuration, such as a thermal transmission configuration (e.g., a thermal throttling configuration), to reduce throughput associated with the non-priority group of LCHs to (at most) R-Rq. The thermal throttling based approach may be simpler to implement than the duty cycle based approach, whereas the duty cycle based approach may be more energy-efficient than the thermal throttling based approach.

As indicated above, FIG. 4 is provided as an example. Other examples may differ from what is described with regard to FIG. 4.

FIG. 5 is a diagram illustrating an example process 500 performed, for example, by a user equipment (UE), in accordance with the present disclosure. Example process 500 is an example where the UE (e.g., UE 120) performs operations associated with techniques for uplink quality of service management for shared channel transmission.

As shown in FIG. 5, in some aspects, process 500 may include transmitting, based at least in part on a transmit power configuration, a first communication associated with a first group of logical channels associated with at least a portion of an ON duration of an uplink transmission interval configuration (block 510). For example, the UE (e.g., using transmission component 604, depicted in FIG. 6) may transmit, based at least in part on a transmit power configuration, a first communication associated with a first group of logical channels associated with at least a portion of an ON duration of an uplink transmission interval configuration, as described above. In some aspects, the ON duration may be referred to as a first time interval. The first communication may be associated with a first priority level. For example, the first communication may be associated with a first group of logical channels having the first priority level. As another example, packets of the first communication may be associated with the first priority level.

As further shown in FIG. 5, in some aspects, process 500 may include transmitting, based at least in part on the transmit power configuration, a second communication during at least a portion of an OFF duration of the uplink transmission interval configuration, wherein the transmit power configuration indicates a first amount of energy for the first communication based at least in part on the first communication being associated with the first group of logical channels and a second amount of energy for the second communication based at least in part on the second communication being associated with a second group of logical channels (block 520). For example, the UE (e.g., using transmission component 604, depicted in FIG. 6) may transmit, based at least in part on the transmit power configuration, a second communication during at least a portion of an OFF duration of the uplink transmission interval configuration, wherein the transmit power configuration indicates a first amount of energy for the first communication based at least in part on the first communication being associated with the first group of logical channels and a second amount of energy for the second communication based at least in part on the second communication being associated with a second group of logical channels, as described above. In some aspects, the OFF duration may be referred to as a second time interval. The second communication may be associated with a second priority level. For example, the second communication may be associated with a second group of logical channels having the second priority level. As another example, packets of the second communication may be associated with the second priority level. In some aspects, the first communication may be associated with the first priority level based at least in part on the first communication not being associated with the second priority level. For example, if a communication is not associated with the second priority level, the communication may default to being associated with the first priority level. The second priority level may be higher than the first priority level, such that communications having the second priority level are prioritized over communications having the first priority level (e.g., for the purpose of energy allocation).

Process 500 may include additional aspects, such as any single aspect or any combination of aspects described below and/or in connection with one or more other processes described elsewhere herein.

In a first aspect, process 500 includes determining (e.g., using power management component 608 of FIG. 6) the transmit power configuration based at least in part on an expected payload associated with the second communication.

In a second aspect, alone or in combination with the first aspect, process 500 includes determining (e.g., using power management component 608 of FIG. 6) the transmit power configuration based at least in part on a combination of expected payloads associated with each logical channel of the second group of logical channels.

In a third aspect, alone or in combination with one or more of the first and second aspects, an expected payload, of the expected payloads, is based at least in part on at least one of historical information regarding a payload associated with a logical channel corresponding to the expected payload, or information regarding a service associated with the expected payload.

In a fourth aspect, alone or in combination with one or more of the first through third aspects, process 500 includes transmitting a buffer status report associated with the first communication, wherein the buffer status report indicates a diminished buffer status based at least in part on the second amount of energy.

In a fifth aspect, alone or in combination with one or more of the first through fourth aspects, the diminished buffer status is determined based at least in part on a target modulation and coding scheme for the second communication.

In a sixth aspect, alone or in combination with one or more of the first through fifth aspects, the diminished buffer status is determined based at least in part on a target block error rate for the second communication.

In a seventh aspect, alone or in combination with one or more of the first through sixth aspects, the diminished buffer status is determined based at least in part on a maximum number of bytes associated with the second communication and a maximum number of bytes associated with the first communication.

In an eighth aspect, alone or in combination with one or more of the first through seventh aspects, the first amount of energy is based at least in part on reserving an amount of energy for signaling of a control channel or a reference signal.

In a ninth aspect, alone or in combination with one or more of the first through eighth aspects, the second group of logical channels is not subject to the uplink transmission interval configuration.

In a tenth aspect, alone or in combination with one or more of the first through ninth aspects, the second group of logical channels is associated with at least one of Voice over Internet Protocol traffic, videoing telephony traffic, a signaling radio bearer, or defaulting bearer priority queue traffic.

In an eleventh aspect, alone or in combination with one or more of the first through tenth aspects, the second group of logical channels is associated with a higher priority level than the first group of logical channels.

In a twelfth aspect, alone or in combination with one or more of the first through eleventh aspects, the second communication is transmitted using a power level indicated by the transmit power configuration irrespective of whether the second communication is transmitted during the ON duration or the OFF duration.

In a thirteenth aspect, alone or in combination with one or more of the first through twelfth aspects, a buffer status report associated with the first communication associated with the first group of logical channels indicates a zero buffer status.

In a fourteenth aspect, alone or in combination with one or more of the first through thirteenth aspects, the first amount of energy is based at least in part on an average throughput associated with the first group of logical channels and the second amount of energy is based at least in part on an average throughput associated with the second group of logical channels.

In a fifteenth aspect, alone or in combination with one or more of the first through fourteenth aspects, the uplink transmission interval configuration is a thermal transmission configuration.

In a sixteenth aspect, alone or in combination with one or more of the first through fifteenth aspects, the uplink transmission interval configuration is a duty cycle based physical uplink shared channel transmission configuration.

In a seventeenth aspect, alone or in combination with one or more of the first through sixteenth aspects, process 500 includes determining the second group of logical channels.

In an eighteenth aspect, alone or in combination with one or more of the first through seventeenth aspects, process 500 includes determining that the uplink transmission interval configuration is in use, wherein the second amount of energy is reserved based at least in part on the uplink transmission interval configuration being in use.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
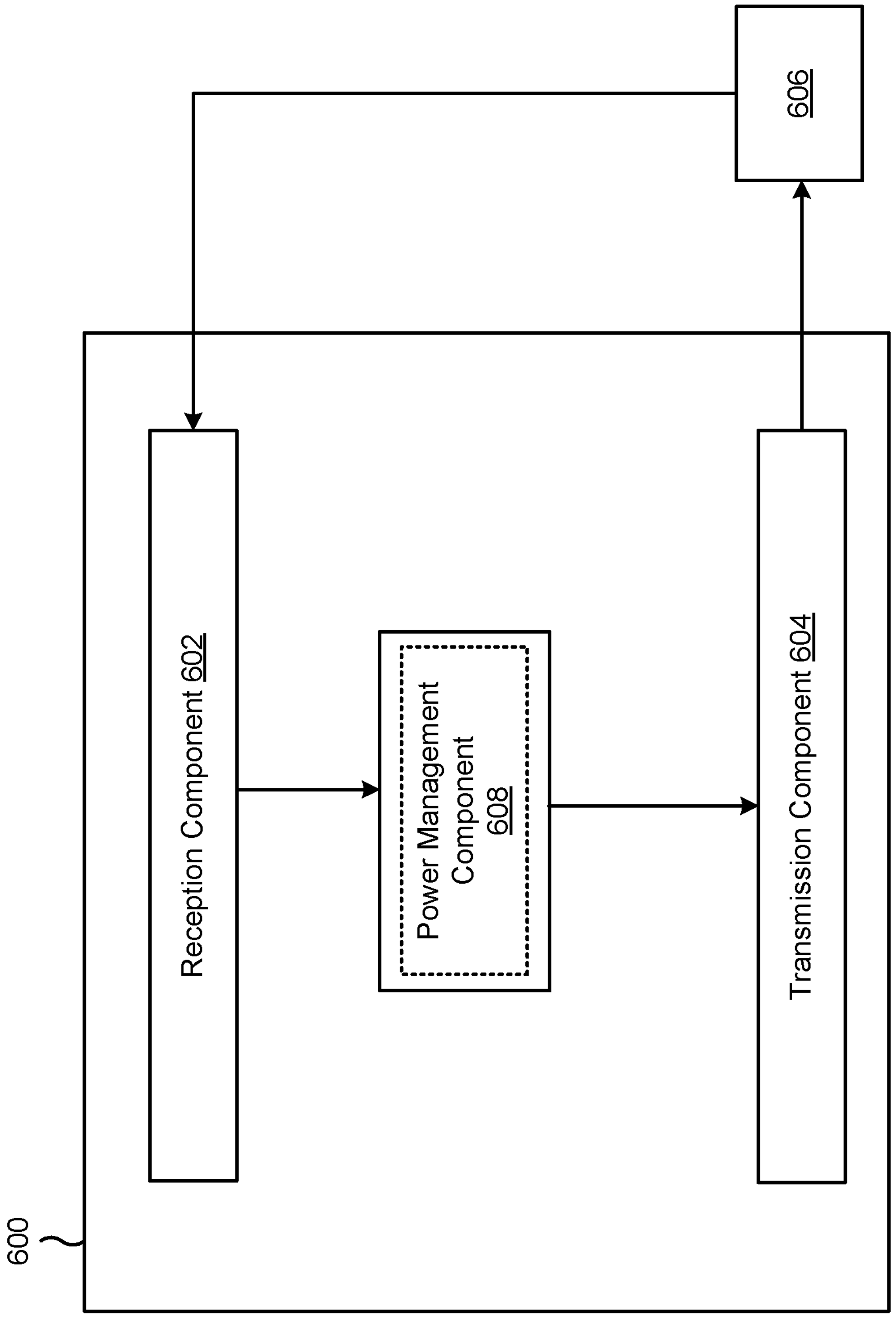
FIG. 6 is a block diagram of an example apparatus for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include a power management component 608, among other examples.

In some aspects, the apparatus 600 may be configured to perform one or more operations described herein in connection with FIGS. 3-4. Additionally, or alternatively, the apparatus 600 may be configured to perform one or more processes described herein, such as process 500 of FIG. 5, or a combination thereof. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The transmission component 604 may transmit, based at least in part on a transmit power configuration, a first communication associated with a first group of logical channels associated with at least a portion of an ON duration of an uplink transmission interval configuration. The transmission component 604 may transmit, based at least in part on the transmit power configuration, a second communication during at least a portion of an OFF duration of the uplink transmission interval configuration, wherein the transmit power configuration indicates a first amount of energy for the first communication based at least in part on the first communication being associated with the first group of logical channels and a second amount of energy for the second communication based at least in part on the second communication being associated with a second group of logical channels.

The transmission component 604 may transmit, based at least in part on a transmit configuration, a first communication associated with at least a portion of an ON duration of an uplink transmission interval configuration, wherein the first communication is associated with a first group of logical channels. The transmission component 604 may transmit, based at least in part on the transmit configuration, a second communication during at least a portion of an OFF duration of the uplink transmission interval configuration, wherein the transmit configuration indicates the first number of bytes based at least in part on the first communication being associated with the first group of logical channels and the second number of bytes based at least in part on the second communication being associated with a second group of logical channels.

The power management component 608 may determine the transmit power configuration based at least in part on an expected payload associated with the second communication. The power management component 608 may determine the transmit power configuration based at least in part on a combination of expected payloads associated with each logical channel of the second group of logical channels. The power management component 608 may determine that the uplink transmission interval configuration is in use, wherein the second amount of energy is reserved based at least in part on the uplink transmission interval configuration being in use. In some aspects, the power management component 608 may include a transmit processor, a controller/processor, a memory, or a combination thereof, of the UE described above in connection with FIG. 2. In some aspects, the power management component 608 may be implemented in a medium access control (MAC) layer of the apparatus 600.

The transmission component 604 may transmit a buffer status report associated with the first communication, wherein the buffer status report indicates a diminished buffer status based at least in part on the second amount of energy.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
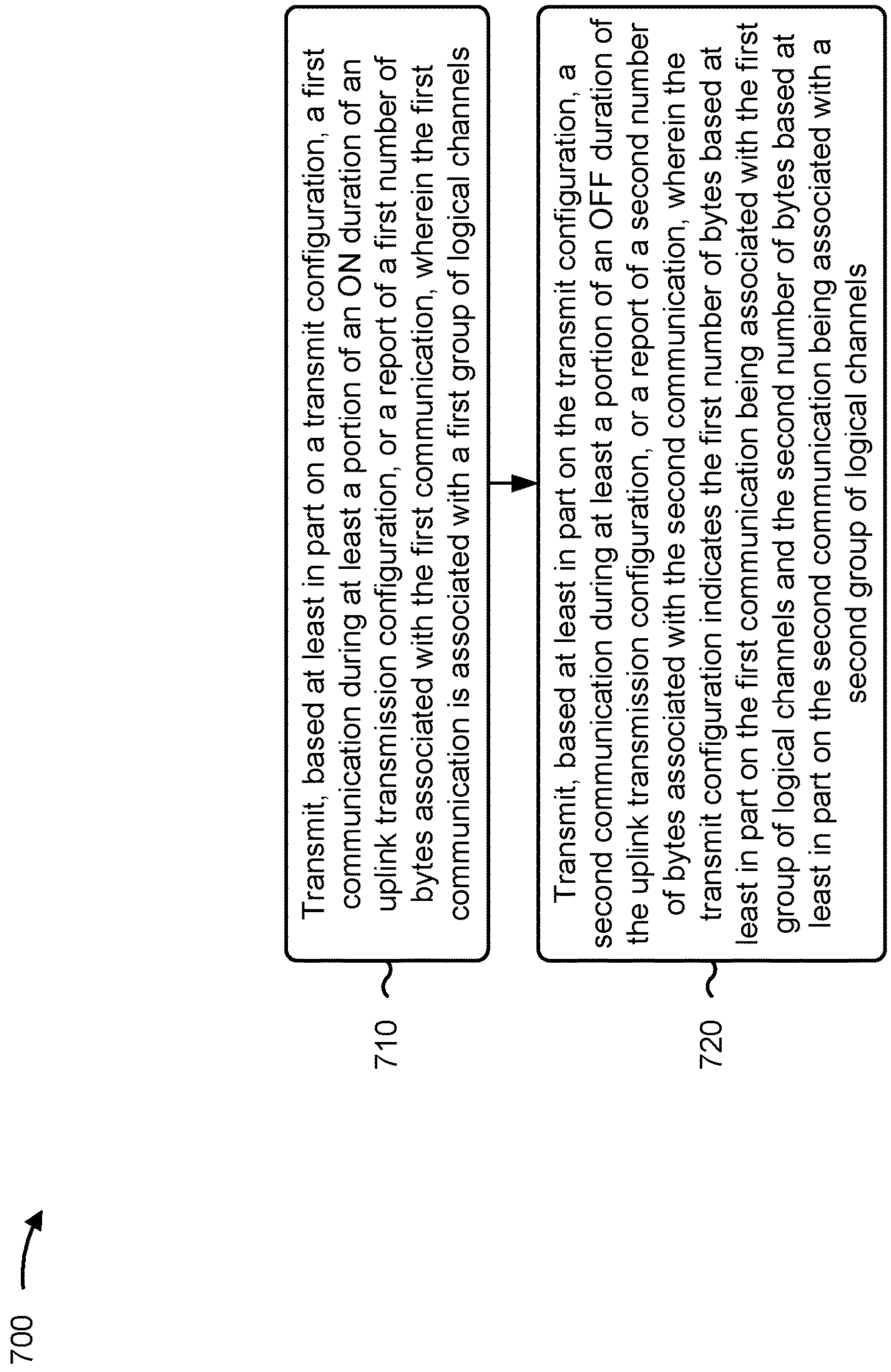
FIG. 7 is a diagram illustrating an example process performed, for example, by a UE, in accordance with the present disclosure.

FIG. 7 is a diagram illustrating an example process 700 performed, for example, by a user equipment (UE), in accordance with the present disclosure. Example process 700 is an example where the UE (e.g., UE 120) performs operations associated with techniques for uplink quality of service management for shared channel transmission.

As shown in FIG. 7, in some aspects, process 700 may include transmitting, based at least in part on a transmit configuration, a first communication associated with at least a portion of a first time interval of an uplink transmission interval configuration, wherein the first communication is associated with a first priority level (block 710). For example, the UE (e.g., using transmission component 604, depicted in FIG. 6) may transmit, based at least in part on a transmit configuration, a first communication associated with at least a portion of an ON duration of an uplink transmission interval configuration, wherein the first communication is associated with a first group of logical channels, as described above. In some aspects, the ON duration may be referred to as a first time interval. The first communication may be associated with a first priority level. For example, the first communication may be associated with a first group of logical channels having the first priority level. As another example, packets of the first communication may be associated with the first priority level.

As further shown in FIG. 7, in some aspects, process 700 may include transmitting, based at least in part on the transmit configuration, a second communication during at least a portion of an OFF duration of the uplink transmission interval configuration, wherein the transmit configuration indicates the first number of bytes based at least in part on the first communication being associated with the first group of logical channels and the second number of bytes based at least in part on the second communication being associated with a second group of logical channels (block 720). For example, the UE (e.g., using transmission component 604, depicted in FIG. 6) may transmit, based at least in part on the transmit configuration, a second communication during at least a portion of an OFF duration of the uplink transmission interval configuration, wherein the transmit configuration indicates the first number of bytes based at least in part on the first communication being associated with the first group of logical channels and the second number of bytes based at least in part on the second communication being associated with a second group of logical channels, as described above. In some aspects, the OFF duration may be referred to as a second time interval. The second communication may be associated with a second priority level. For example, the second communication may be associated with a second group of logical channels having the second priority level. As another example, packets of the second communication may be associated with the second priority level. In some aspects, the first communication may be associated with the first priority level based at least in part on the first communication not being associated with the second priority level. For example, if a communication is not associated with the second priority level, the communication may default to being associated with the first priority level. The second priority level may be higher than the first priority level, such that communications having the second priority level are prioritized over communications having the first priority level (e.g., for the purpose of energy allocation).

Process 700 may include additional aspects, such as any single aspect or any combination of aspects described below and/or in connection with one or more other processes described elsewhere herein.

In a first aspect, the first number of bytes is associated with a first amount of energy and the second number of bytes is associated with a second amount of energy, wherein the first amount of energy is designed to reserve the second amount of energy for transmission of the second communication.

In a second aspect, alone or in combination with the first aspect, process 700 includes determining the transmit configuration based at least in part on an expected payload associated with the second communication.

In a third aspect, alone or in combination with one or more of the first and second aspects, process 700 includes determining the transmit configuration based at least in part on a combination of expected payloads associated with each logical channel of the second communication.

In a fourth aspect, alone or in combination with one or more of the first through third aspects, an expected payload, of the expected payloads, is based at least in part on at least one of historical information regarding a payload associated with a logical channel corresponding to the expected payload, or information regarding a service associated with the expected payload.

In a fifth aspect, alone or in combination with one or more of the first through fourth aspects, the report of the first number of bytes is a buffer status report associated with the first communication, wherein the buffer status report indicates a diminished buffer status based at least in part on the second number of bytes.

In a sixth aspect, alone or in combination with one or more of the first through fifth aspects, the diminished buffer status is determined based at least in part on a target modulation and coding scheme for the second communication.

In a seventh aspect, alone or in combination with one or more of the first through sixth aspects, the diminished buffer status is determined based at least in part on a target block error rate for the second communication.

In an eighth aspect, alone or in combination with one or more of the first through seventh aspects, the diminished buffer status is determined based at least in part on a maximum number of bytes associated with the second communication and a maximum number of bytes associated with the first communication.

In a ninth aspect, alone or in combination with one or more of the first through eighth aspects, the first number of bytes is based at least in part on reserving an amount of energy for signaling of a control channel or a reference signal.

In a tenth aspect, alone or in combination with one or more of the first through ninth aspects, the second group of logical channels is not subject to the uplink transmission interval configuration.

In an eleventh aspect, alone or in combination with one or more of the first through tenth aspects, the second group of logical channels is associated with at least one of Voice over Internet Protocol traffic, videoing telephony traffic, a signaling radio bearer, or defaulting bearer priority queue traffic.

In a twelfth aspect, alone or in combination with one or more of the first through eleventh aspects, the second group of logical channels is associated with a higher priority level than the first group of logical channels.

In a thirteenth aspect, alone or in combination with one or more of the first through twelfth aspects, the second communication is transmitted using a power level based at least in part on the transmit configuration irrespective of whether the second communication is transmitted during the ON duration or the OFF duration.

In a fourteenth aspect, alone or in combination with one or more of the first through thirteenth aspects, the report of the first number of bytes is a buffer status report associated with the first communication associated with the first group of logical channels, and wherein the buffer status report indicates a zero buffer status.

In a fifteenth aspect, alone or in combination with one or more of the first through fourteenth aspects, the first number of bytes is based at least in part on an average throughput associated with the first group of logical channels and the second number of bytes is based at least in part on an average throughput associated with the second group of logical channels.

In a sixteenth aspect, alone or in combination with one or more of the first through fifteenth aspects, the uplink transmission interval configuration is a thermal transmission configuration.

In a seventeenth aspect, alone or in combination with one or more of the first through sixteenth aspects, the uplink transmission interval configuration is a duty cycle based physical uplink shared channel transmission configuration.

In an eighteenth aspect, alone or in combination with one or more of the first through seventeenth aspects, process 700 includes determining the second group of logical channels.

In a nineteenth aspect, alone or in combination with one or more of the first through eighteenth aspects, process 700 includes determining that the uplink transmission interval configuration is in use, wherein the second number of bytes is reserved based at least in part on the uplink transmission interval configuration being in use.

In a twentieth aspect, alone or in combination with one or more of the first through nineteenth aspects, the first number of bytes is based at least in part on a counter initialized by subtracting, from a total number of bytes allowed for transmission by the UE, the second number of bytes.

In a twenty-first aspect, alone or in combination with one or more of the first through twentieth aspects, the counter is decremented by a number of bytes transmitted for the first communication in a shared channel.

In a twenty-second aspect, alone or in combination with one or more of the first through twenty-first aspects, if a size of a grant for a given PUSCH exceeds a current value of the counter, or if no traffic from the second communication is included in a transport block for the given PUSCH, the grant is skipped.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Some data throttling solutions (such as based at least in part on link budget data throttling) involve the UE estimating several parameters, such as path loss (PL), base-station noise figure (NF), and actual link block error rate (BLER) and overhead, which are difficult for the UE to estimate accurately. The errors introduced by the estimates affect the performance of the data throttling algorithm. Adding complexity to the algorithm to estimate and reduce the error may outweigh the benefits of doing so. Furthermore, a UE may communicate using multiple radios. Some techniques for data throttling address multiple radio scenarios (e.g., dual connectivity) in a simple way, by turning off radios other than the radio carrying traffic associated with a threshold priority level (such as VoIP) to protect the traffic. Such techniques may not take advantage of the availability of multiple radios to improve throughput and/or make more efficient use of the RF exposure budget when the other radio is experiencing better radio conditions or can more efficiently use the RF exposure budget. In addition, some RF exposure compliance algorithms may allocate RF exposure energy from multiple energy budgets when the UE is configured by an original equipment manufacturer with multiple antenna groups (AGs). Without multiple RF exposure budget handling, the UE may not make optimal use of the budgets and could also fail to protect high priority traffic budgets in some cases, leading to a poor quality of service experience for a user. Some techniques described herein, such as (but not exclusively) those described with regard to FIGS. 8-12, provide data throttling for compliance with SAR/MPE limitations in a fashion that accounts for multiple energy budgets and multiple communications.

Figure 8:
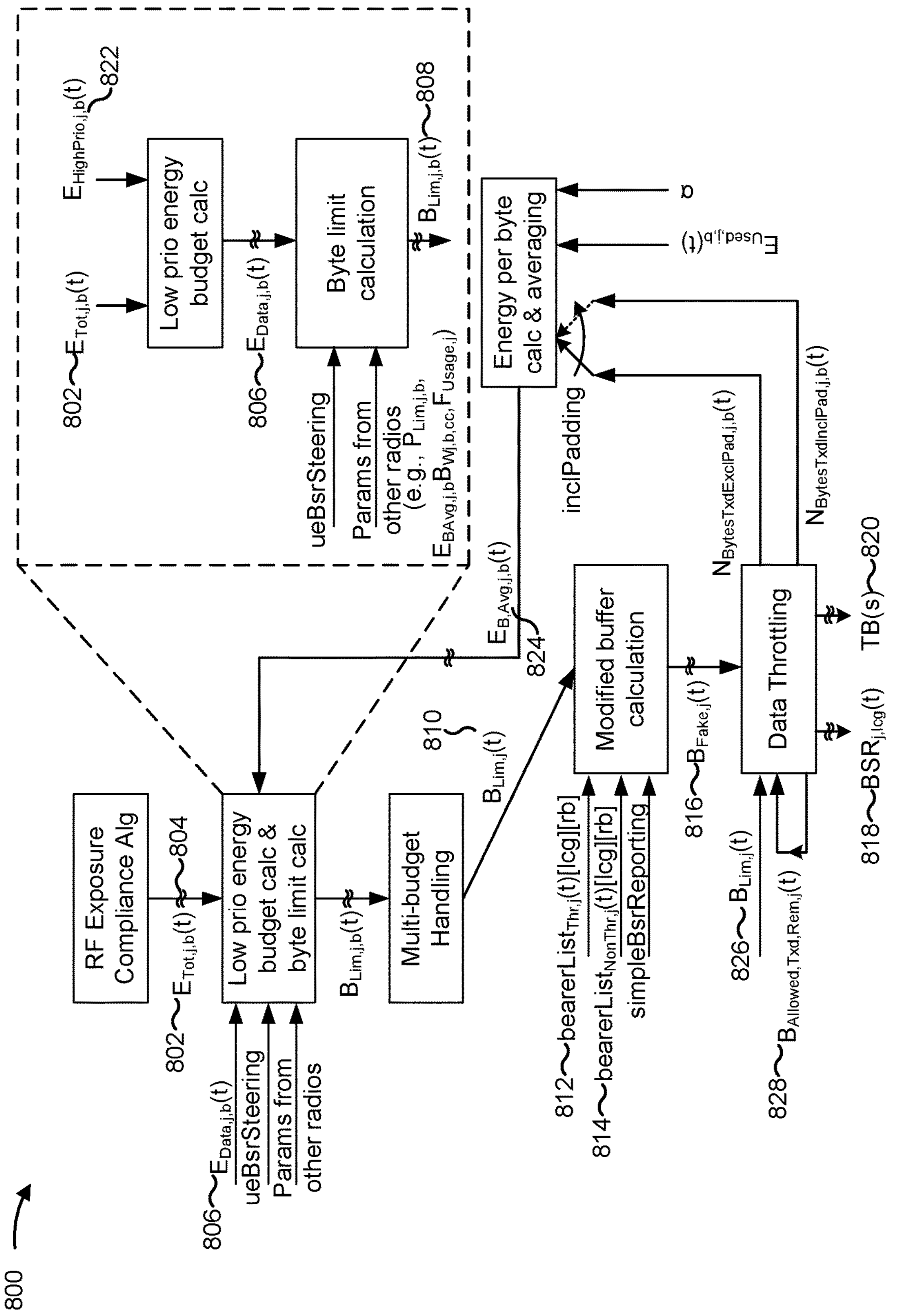
FIG. 8 is a diagram illustrating an example of data throttling based at least in part on a buffer status report, in accordance with the present disclosure.

FIG. 8 is a diagram illustrating an example 800 of data throttling based at least in part on a buffer status report, in accordance with the present disclosure. The UE may receive or determine one or more energy allocations ($E_{Tot,j,b}(t)$) (for one or more radios j, one or more energy budgets b, and a time window t) from an RF exposure compliance algorithm, as shown by reference number 802. In example 800 (and in FIGS. 9-12), the symbol shown by reference number 804 indicates that a given parameter or value can be provided for each communication link and/or energy buffer associated with the UE. The UE may determine a throttleable energy budget ($E_{Data,j,b}(t)$, shown by reference number 806) based at least in part on the one or more energy allocations and an energy budget for traffic associated with a threshold priority value ($E_{HighPrio,j,b}(t)$, shown by reference number 822). The UE may determine one or more byte limits ($B_{Lim,j,b}(t)$, shown by reference number 808) for each energy budget based at least in part on a steering mode of the UE, described in connection with FIG. 10. The determination of the one or more byte limits may be based at least in part on an average energy per byte ($E_{B,Avg,j,b}(t)$, shown by reference number 824), which may be based at least in part on a number of transmitted bytes ($N_{BytesTxdExclPadj,b}(t)$ and $N_{BytesTxdInclPad,j,b}(t)$), a used energy budget of the UE ($E_{Used,j,b}(t)$), or the like, as described in more detail in connection with FIG. 9.

The UE may perform multi-budget handling to convert multiple allowed byte values ($B_{Lim,j,b}(t)$) into a single byte limit value for a given communication link ($B_{Lim,j}(t)$, shown by reference number 810). Upon receiving a new byte limit for a communication link or determining that a BSR has been triggered, the UE may determine a set of throttleable bearers ($bearerList_{Thr,j}(t)[lcg][rb]$, shown by reference number 812), which may indicate a set of bearers associated with lower than a threshold priority value that are allowed to transmit on the communication link for each logical channel group (LCG) of the UE. The UE may also determine a set of non-throttleable bearers ($bearerList_{NonThr,j,lcg}(t)[lcg][rb]$, shown by reference number 814), which may indicate a set of bearers associated with a threshold priority value that are allowed to transmit on the communication, for each LCG of the UE.

The UE may determine one or more modified buffers for throttleable data ($B_{LowPrioThr,j,lcg}(t)$), such as based at least in part on the byte limit value, the set of throttleable bearers, and a simple BSR reporting mode (described in more detail elsewhere herein). The UE may determine a fake buffer $B_{Fake,j}(t)$ 816 and a BSR by adding the output of the modified buffer ($B_{LowPrioThr,j,lcg}(t)$) to a data volume associated with the set of non-throttleable bearers ($B_{HiPrio,NonThr,j,lcg}(t)$) (that are allowed to transmit on the communication link) as well as any other reportable non-throttleable bytes (e.g., status bytes and re-transmission bytes), for each LCG.

The UE may perform BSR reporting based at least in part on data throttling to protect an energy budget for non-throttleable traffic, such as traffic associated with the set of non-throttleable bearers. For example, if a BSR is triggered, the UE may transmit the BSR (shown by reference number 818) based at least in part on the modified buffers ($B_{Fake,j}(t)$) 816 and/or any other non-throttleable bytes, as described above. During an RF exposure interval, the UE may perform data throttling of low priority data (e.g., data associated with lower than a threshold priority level). For example, once the UE has transmitted all of the throttleable bytes (e.g., all bytes associated with a set of throttleable bearers that can be transmitted using a remaining energy allocated for the set of throttleable bearers) that can be transmitted in the RF exposure interval, the UE may report a buffer status of 0 bytes for the throttleable traffic in the BSR. As shown by reference number 820, the UE may perform an uplink transmission (e.g., of one or more transport blocks) based at least in part on the BSR. For example, the UE may use granted resources (which may be granted based at least in part on the BSR) for transmissions of communications associated with the threshold priority value and (as the energy budget permits) communications not associated with the threshold priority value.

As indicated above, FIG. 8 is provided as an example. Other examples may differ from what is described with regard to FIG. 8.

Figure 9:
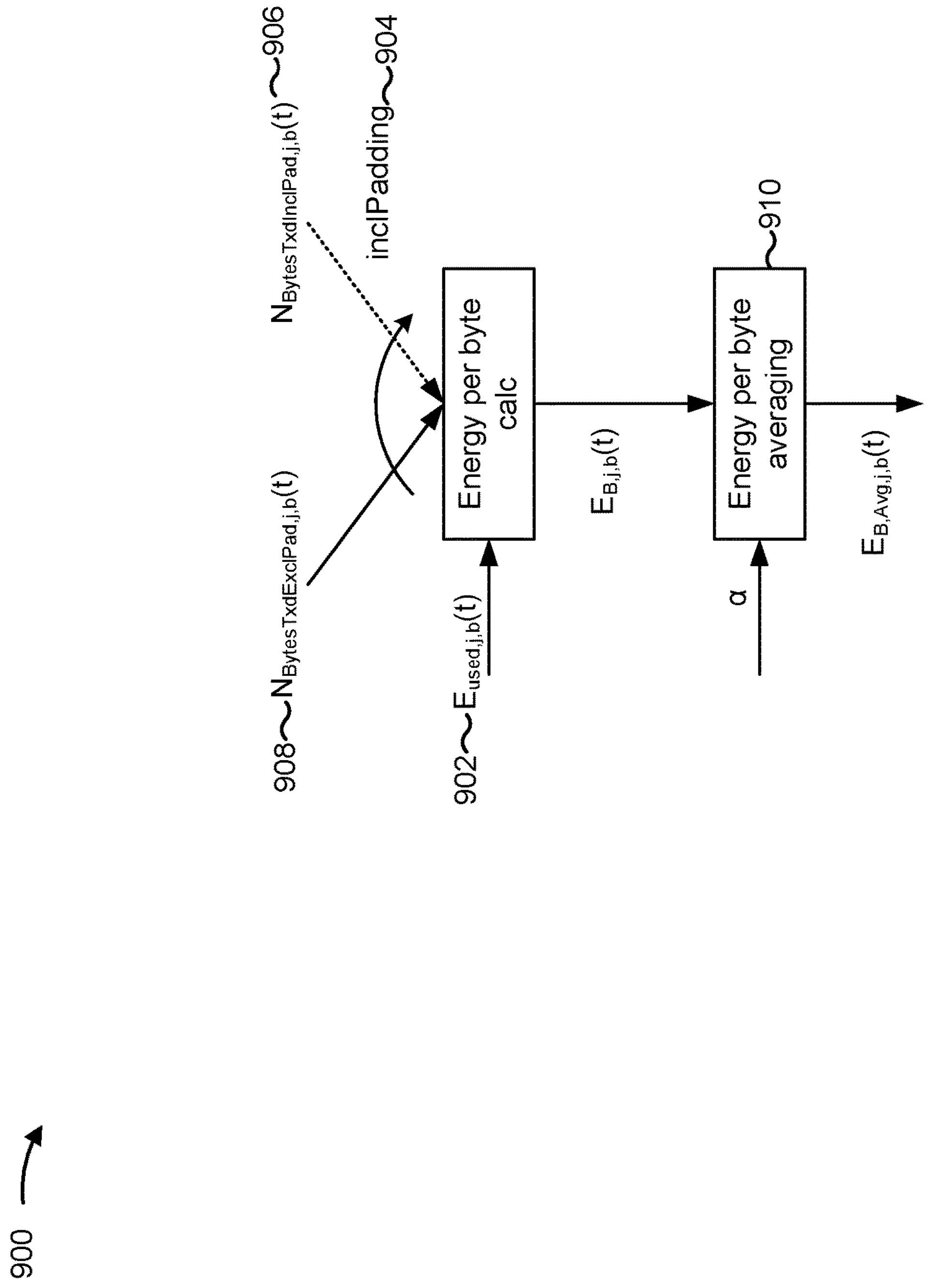
FIG. 9 is a diagram illustrating an example of determination of an average energy per byte, in accordance with the present disclosure.

FIG. 9 is a diagram illustrating an example 900 of determination of an average energy per byte, in accordance with the present disclosure. The operations of example 900 may be performed by a UE (e.g., UE 120). The determination of the average energy per byte may be performed per energy budget b and per communication link j. The UE may maintain an average energy per byte value $E_{B,Avg,j,b}(t)$ for each energy budget active on each active communication link. The UE may determine the average energy per byte value for an energy budget. For example, the UE may determine a most recent energy per byte value by dividing the energy used ($E_{Used,j,b}(t)$, shown by reference number 902) in the past measurement interval by the total number of bytes transmitted in the past measurement interval. If the parameter "inclPadding" (shown by reference number 904) is set to true, the UE includes padding bytes (indicated by $N_{BytesTxdInclPad,j,b}(t)$ and reference number 906). If inclPadding is set to false, the UE excludes the padding bytes (indicated by $N_{BytesTxdExclPad,j,b}(t)$ and reference number 908). Including the padding bytes may provide an exact energy per byte statistic, while excluding padding bytes allows the UE to take into account extra or unwanted grants that the UE did not request from the base station (such as extra grant bytes given by a generous scheduler or pre-scheduling grants). If inclPadding is set to true, $E_{B,j,b}(t)=E_{Used,j,b}(t)/N_{BytesTxdInclPad,j,b}(t)$. If inclPadding is set to false, $E_{B,j,b}(t)=E_{Used,j,b}(t)/N_{BytesTxdExclPad,j,b}(t)$.

In some aspects, the UE may filter the energy per byte samples $E_{B,j,b}(t)$ to obtain the average energy per byte value $E_{B,Avg,j,b}(t)$, as shown by reference number 910. In some aspects, the UE may filter the energy per byte samples using an infinite impulse response (IIR) filter, which can be implemented with low complexity. The UE may determine the average energy per byte value as $E_{B,Avg,j,b}(t)=(1-\alpha)*E_{B,Avg,j,b}(t)+\alpha*E_{B,j,b}(t)$, where α represents a configurable coefficient between 0 and 1.

As indicated above, FIG. 9 is provided as an example. Other examples may differ from what is described with regard to FIG. 9.

Figure 10:
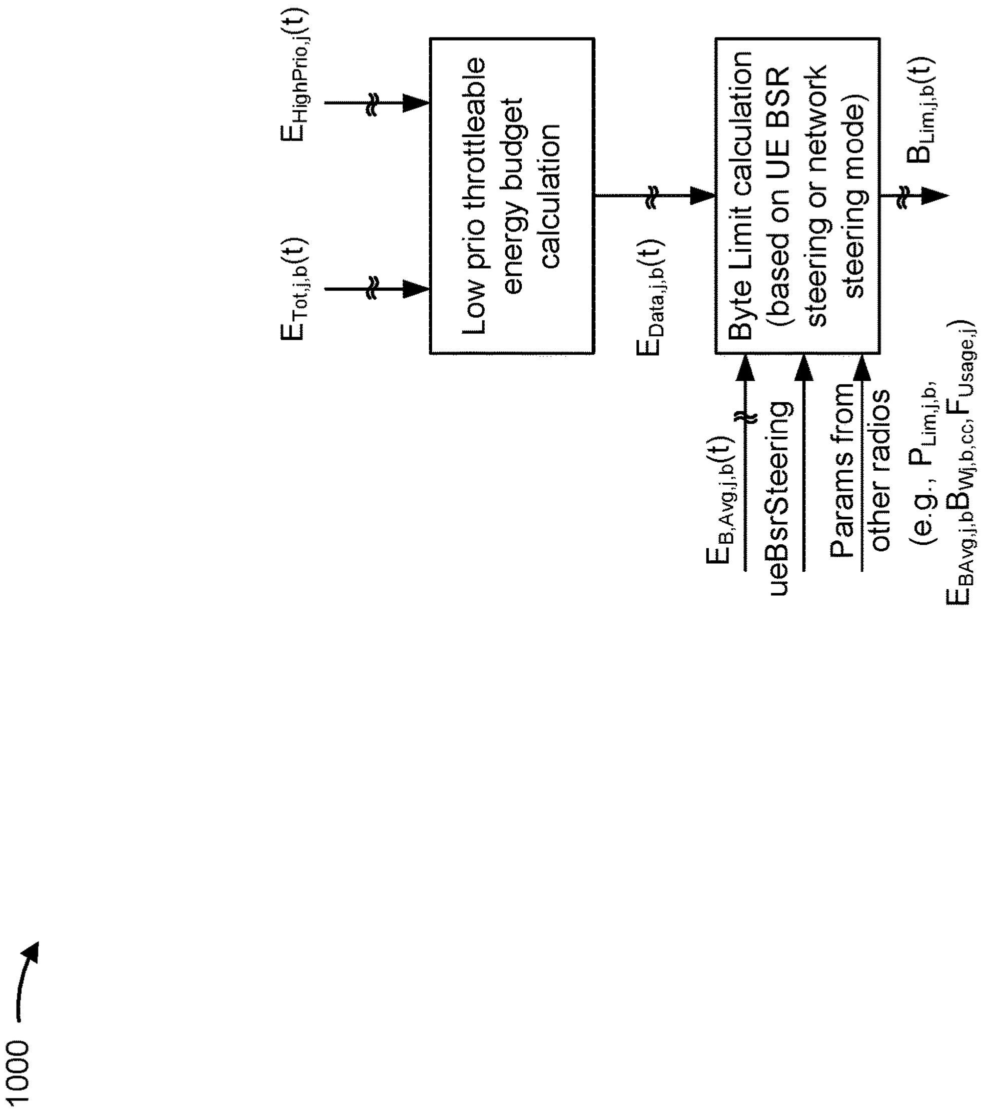
FIG. 10 is a diagram of an example of determining an amount of energy for transmission of communications with lower than a threshold priority value, in accordance with the present disclosure.

FIG. 10 is a diagram of an example 1000 of determining an amount of energy for transmission of communications with lower than a threshold priority value, in accordance with the present disclosure. Example 1000 illustrates example techniques for protecting an energy budget of high priority traffic.

At the beginning of an RF exposure interval (TRfExpoInt), each of the UE's communication links may receive one or more RF exposure energy allocations ($E_{Tot,j,b}(t)$) that are valid for the RF exposure interval. To protect an energy budget for traffic associated with a threshold priority level, each of the UE's communication links may set aside a non-throttleable portion ($E_{HighPrio,j,b}(t)$) of the one or more RF exposure energy allocations by subtracting $E_{HighPrio,j,b}(t)$ (which may be requested by each communication link) from the corresponding RF exposure energy allocation ($E_{Tot,j,b}(t)$). This ensures that the traffic associated with the threshold priority level can be transmitted and that the UE protects the energy budget(s) of high priority traffic by throttling the low priority traffic (such as by under-reporting the low priority data's buffer sizes in the BSR, as described above).

The UE may estimate the maximum number of low priority throttleable bytes that the UE can transmit based at least in part on $E_{Data,j,b}(t)$ and the energy per byte value ($E_{B,Avg,j,b}(t)$) determined in connection with FIG. 9. The maximum number of bytes that can be transmitted using energy budget b on communication link j is referred to herein as the byte limit and denoted "$B_{Lim,j,b}(t)$". The byte limit for a communication link and energy budget may be determined as $B_{Lim,j,b}(t)=E_{Data,j,b}(t)/E_{B,Avg,j,b}(t)$.

In some aspects, the UE may determine a byte limit based at least in part on a steering mode. In some aspects, the steering mode may be a UE BSR steering mode. In the UE BSR steering mode, the UE may determine a respective byte limit for each communication link, and the respective byte limits may differ from one another. In some other aspects, the steering mode may be a network steering mode. In the network steering mode, the UE may determine a byte limit that is used for all of the communication links and energy budgets of the UE.

Example pseudocode for determining a byte limit using a UE BSR steering mode is provided below. In the pseudocode, "//" denotes a code comment.

a. Initiate: $BW_{Config,Totj,b}(t)$ = 0 MHz
b. For each active communication link j:
   i. Set $BW_{config,Totj,b}(t)$ to the total sum of all component carriers on communication link "j" that are associated with energy budget "b".
c. // Calculate the metric "$m_{j,b}(t)$" for each active communication link.
d. For each active communication link j:
   i. $_{mj,b}(t) = BW_{Config,Tot,j,b}(t) * P_{Lim,j,b}(t) * F_{Usage,j,b}(t) / E_{B,Avg,j,b}(t)$
e. // Compute the coefficients to split the total energy and the byte limit for each active communication link.
f. For each active communication link j:
   i. $c_{j,b}(t) = m_{j,b}(t)$ / SUM{$m_{j,b}(t)$ over all active cell groups}
   ii. $B_{Lim,j,b}(t) = [E_{Data,j,b}(t) * c_{j,b}(t)] / E_{B,Avg,j,b}(t)$ Example pseudocode for determining a byte limit using a network steering mode is provided below. In the pseudocode, "//" denotes a code comment.

a. // Compute the shared budget from the $E_{Dataj,b}(t)$.
b. $T_{Shared,b}(t) = E_{Data,j,b}(t) / P_{Lim,j,b}(t)$
c. // Compute the avg $P_{Lim}/E_{B,Avg,b}(t)$ metric for each communication link "j". Uses $P_{Lim}(t)$ and $E_{B,Avg,b}(t)$ values for both communication links.
d. For each active communication link "j":
   i. #z,24;$_{j,b}(t) = P_{Lim,j,b}(t) / E_{B,Avg,j,b}(t)$
e. $\gamma_{Avg,j,b}(t)$ = SUM{$\gamma_{j,b}(t)$ over $N_{ActiveRadios}$ active communication links } / $N_{ActiveRadios}(t)$
f. // Compute the "common" byte limit that will be used by the active communication links.
g. For each active radio "j":
   i. $B_{Lim,j,b}(t) = T_{Shared,b}(t) * \gamma_{Avg,j,b}(t)$ As indicated above, FIG. 10 is provided as an example. Other examples may differ from what is described with regard to FIG. 10.

Figure 11:
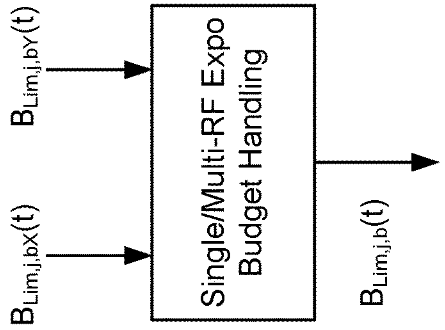
FIG. 11 is a diagram illustrating an example of handling of multiple energy budgets for a single communication link, in accordance with the present disclosure.

FIG. 11 is a diagram illustrating an example 1100 of handling of multiple energy budgets for a single communication link, in accordance with the present disclosure. In some aspects, the UE may use multiple energy budgets for a given communication link, such as based at least in part on an antenna associated with a radio belonging to multiple antenna groups. If the UE provides multiple energy budgets for a given communication link, the UE may convert multiple byte limits (corresponding to the multiple energy budgets) of the given communication link into a single byte limit by taking the MIN{ } (i.e., the minimum) of the multiple byte limits: $B_{Lim,j}(t)=MIN\{B_{Lim,j,b1}(t), B_{Lim,j,b2}(t), \ldots, B_{Lim,j,bN}(t)\}$. The single byte limit is shown by reference number 826 of FIG. 8, and is shown in FIG. 11. If a communication link is associated with a single energy budget, then a byte limit of the single energy budget can be used for the communication link: $B_{Lim,j}(t)=B_{Lim,j,b}(t)$. The UE may set an updated byte limit used by the modified buffer calculation for BSR reporting (where the updated byte limit is represented by "$B_{Allowed,Rprt,Rem,j}(t)$") and to keep track of the number of throttleable bytes transmitted during the interval (where the number of transmittable throttleable bytes is represented by "$B_{Allowed,Txd,Rem,j}(t)$", shown by reference number 828 of FIG. 8): $B_{Allowed,Rprt,Remj}(t)=B_{Lim,j}(t)$; and $B_{Allowed,Txd,Rem,j}(t)=B_{Lim,j}(t)$.

As mentioned above in connection with FIG. 8, the UE may determine a modified buffer status in order to implement throttling of throttleable traffic (e.g., traffic with lower than a threshold priority level). For example, the UE may determine the modified buffer status per group of logical channels and per communication link. The UE may determine the modified buffer status based at least in part on $B_{Allowed,Rprt,Rem,j}(t)$ (e.g., the remaining allowed throttleable bytes that can be reported for a given communication link across all BSRs and LCGs), bearerLis$_{Thr}$(t)[lcg][rb], bearerList$_{NonThr}$(t)[lcg][rb], and a parameter simpleBsrReporting. bearerList$_{Thr}$(t)[lcg][rb] may indicate a set of throttleable bearers, for an LCG, allowed to transmit on a given communication link. bearerList$_{Thr}$(t)[lcg][rb] may be sorted such that split bearers that are splitting traffic (e.g., a split bearer for which a buffer exceeds or is equal to a split threshold) with a largest split threshold are placed first in the list. Any remaining throttleable bearers may be placed in logical channel prioritization order. bearerList$_{NonThr}$ (t)[lcg][rb] may indicate a set of non-throttleable bearers associated with an LCG, allowed to transmit on a given communication link, in logical channel prioritization order. The parameter simpleBsrReporting may indicate whether to perform simplified BSR processing. If simpleBsrReporting is set to true, the UE may sum data volume of all bearers, which reduces complexity of modified buffer determination. Specifically, this may reduce the complexity of the algorithm for split bearers, splitting traffic when the communication link is the secondary path of the bearer, since the UE does not need to check if the limited buffer size still meets the split threshold). The simpleBsrReporting mode may be used for the UE BSR steering mode, in which the UE may steer grants by choosing exactly how many bytes to report on each communication link.

If the UE has determined an updated byte limit (as described above) in a slot, and if the UE is processing a first LCG or determining a first BSR in the slot, the UE may initialize the allowed bytes parameter using the updated byte limit: $B_{Allowed,Rprt,Rem,j}$(t, first lcg)=$B_{Lim,j}(t)$. If the UE is processing a subsequent LCG or determining a subsequent BSR (after the first LCG or BSR) in the slot, the UE may use remaining allowed reportable throttleable bytes from a previous iteration of the modified buffer calculation (e.g., for an LCG processed prior to the current LCG): $B_{Allowed,Rprt,Rem,j}$(t, n$^{th}$ lcg)=$B_{Allowed,Rprt,Rem,out,j}$(t, n−1$^{th}$ lcg).

If execution of the modified buffer calculation was triggered during a time interval (such as not by updating a byte limit), the UE may use the remaining number of allowed throttleable bytes that can be transmit in the RF exposure interval ($B_{Throttleable,Rprt,Rem,j}(t, lcg)$) from a previous slot or a previous iteration of the modified buffer calculation for a previous LCG: $B_{Allowed,Rprt,Rem,j}$(t, first lcg of this slot)=$B_{Throttleable,Rprt,Rem,j}$(t−1, last lcg of previous slot); OR $B_{Allowed,Rprt,Rem,j}(t, n^{th}\ lcg)=B_{Throttleable,Rem,j}(t, n-1^{th}\ lcg)$.

In some aspects, the UE may determine a number of non-throttleable bytes for each LCG and each communication link of the UE. For example, the modified buffer associated with traffic with lower than a threshold priority value (denoted $B_{LowPnoThr,j,lcg}(t)$) may be determined by accumulating the MIND of the buffer size ($bearer_i$.bufSize) and the remaining allowed bytes ($B_{Allowed,Rprt,Rem,j,lcg}(t)$) of each throttleable bearer allowed to transmit on a given communication link. The UE may start with the split bearers that are splitting traffic (as ordered with bearers having the largest split threshold first), and may continue to process bearers (and assign byte limits) until the remaining byte limit ($B_{Allowed,Rprt,Rem,j,lcg}(t)$) reaches 0 bytes or there are no more bearers to process.

For each LCG, for each throttleable bearer "i" that is allowed to transmit on a communication link "j", and if simpleBsrReporting is set to true, the UE may determine $B_{Reportable}=MIN\{bearer_i.bufSize, B_{Allowed,Rprt,Rem,j,lcg}(t)\}$, $B_{LowPrioThr,j,lcg}(t)+=B_{Reportable}$ (that is, the UE may add $B_{Reportable}$ to $B_{LowPrioThr,j,lcg}(t)$ and may assign the result to $B_{LowPrioThr,j,lcg}(t)$), and $B_{Allowed,Rprt,Rem,j,lcg}(t)-=B_{Reportable}$ (that is, the UE may subtract $B_{Reportable}$ from $B_{Allowed,Rprt,Rem,j,lcg}(t)$ and may assign the result to $B_{Allowed,Rprt,Rem,j,lcg}(t)$). If simpleBsrReporting is false, a bearer is a split bearer, is splitting traffic, and the communication link "j" is in a secondary path of the bearer, the UE may determine $B_{Reportable}=MIN\{bearer_i.bufSize, B_{Allowed,Rprt,Rem,j,lcg}(t)\}$. Continuing this example, if $B_{Reportable} \geq bearer_i.splitThreshold$, $B_{LowPrioThr,j,lcg}(t)+=B_{Reportable}$ and $B_{Rem,j}(t)-=B_{Reportable}$. If the split threshold is no longer met (if $B_{Reportable} < bearer_i.splitThreshold$), the UE may not report the bytes associated with the communication link "j".

To determine the modified buffer (e.g., per LCG and per communication link), the UE may sum the non-throttleable bytes of all bearers in the LCG ($bearerList_{NonThr}(t)[lcg][rb]$) and may add the total non-throttleable bytes ($B_{HiPrioNonThr,j,lcg}(t)$) to the throttleable bytes ($B_{LowPrioThr,j,lcg}(t)$) calculated previously: $B_{Fake,j,lcg}(t)=B_{HiPrio,NonThr,lcg}(t)+B_{LowPrio,Thr,j,lcg}(t)$. In some aspects, the non-throttleable high priority bytes may be reported immediately and may not be limited by the byte limit.

As mentioned above, the UE may perform BSR reporting (such as per LCG and per communication link). For example, if a BSR is triggered (based at least in part on the BSR for the LCG computed above ($BSR_{lcg}(t)$), the UE may transmit one or more BSR(s) to the base-station. The one or more BSRs may indicate a buffer status determined based at least in part on the modified buffer status: $BSR_{lcg}(t)=\Phi\{B_{Fake,j,lcg}(t)\}$.

During an RF exposure interval, the UE may ensure adequate energy budget for non-throttleable traffic (such as traffic associated with a threshold priority level) by limiting the amount of throttleable bytes reported in buffer status reporting to, at most, the allowed bytes ($B_{Allowed,Tx,Rem,j}(t)$). Once the UE has transmitted all the throttleable bytes that can be transmitted in the RF exposure interval according to $B_{Anowed,Tx,Rem,j}(t)$, the UE may report 0 bytes for the throttleable traffic in any future BSR.

As indicated above, FIG. 11 is provided as an example. Other examples may differ from what is described with regard to FIG. 11.

Figure 12:
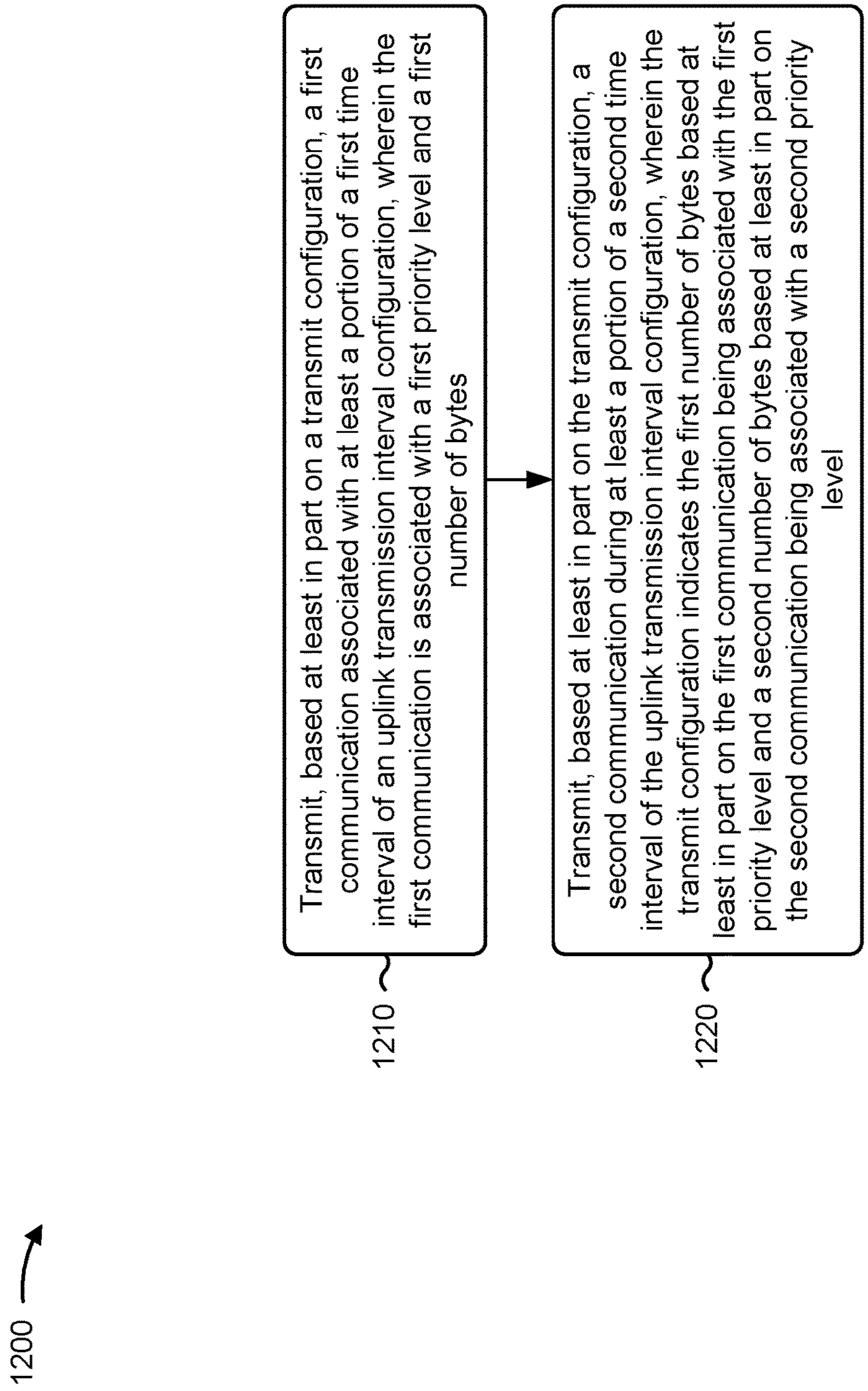
FIG. 12 is a diagram illustrating an example process performed, for example, by a user equipment (UE), in accordance with the present disclosure.

FIG. 12 is a diagram illustrating an example process 1200 performed, for example, by a user equipment (UE), in accordance with the present disclosure. Example process 1200 is an example where the UE (e.g., UE 120) performs operations associated with uplink quality of service management for shared channel transmission.

As shown in FIG. 12, in some aspects, process 1200 may include transmitting, based at least in part on a transmit configuration, a first communication associated with at least a portion of a first time interval of an uplink transmission interval configuration, wherein the first communication is associated with a first priority level and a first number of bytes (block 1210). For example, the UE (e.g., using communication manager 140 and/or transmission component 604, depicted in FIG. 6) may transmit, based at least in part on a transmit configuration, a first communication associated with at least a portion of a first time interval of an uplink transmission interval configuration, wherein the first communication is associated with a first priority level and a first number of bytes, as described above.

As further shown in FIG. 12, in some aspects, process 1200 may include transmitting, based at least in part on the transmit configuration, a second communication during at least a portion of a second time interval of the uplink transmission interval configuration, wherein the transmit configuration indicates the first number of bytes based at least in part on the first communication being associated with the first priority level and a second number of bytes based at least in part on the second communication being associated with a second priority level (block 1220). For example, the UE (e.g., using communication manager 140 and/or transmission component 604, depicted in FIG. 6) may transmit, based at least in part on the transmit configuration, a second communication during at least a portion of a second time interval of the uplink transmission interval configuration, wherein the transmit configuration indicates the first number of bytes based at least in part on the first communication being associated with the first priority level and a second number of bytes based at least in part on the second communication being associated with a second priority level, as described above.

Process 1200 may include additional aspects, such as any single aspect or any combination of aspects described below and/or in connection with one or more other processes described elsewhere herein.

In a first aspect, the first number of bytes is associated with a first amount of energy and the second number of bytes is associated with a second amount of energy, wherein the first amount of energy is designed to reserve the second amount of energy for transmission of the second communication.

In a second aspect, alone or in combination with the first aspect, process 1200 includes determining the transmit configuration based at least in part on an expected payload associated with the second communication.

In a third aspect, alone or in combination with one or more of the first and second aspects, process 1200 includes determining the transmit configuration based at least in part on a combination of expected payloads associated with each logical channel of the second communication.

In a fourth aspect, alone or in combination with one or more of the first through third aspects, an expected payload, of the expected payloads, is based at least in part on at least one of historical information regarding a payload associated with a logical channel corresponding to the expected payload, a modem configuration of the UE, or information regarding a service associated with the expected payload.

In a fifth aspect, alone or in combination with one or more of the first through fourth aspects, the first communication includes a set of payload bytes generated by a service associated with the first priority level, the set of payload bytes including the first number of bytes.

In a sixth aspect, alone or in combination with one or more of the first through fifth aspects, the first communication includes a report of a buffer status indicating the first number of bytes associated with the first communication.

In a seventh aspect, alone or in combination with one or more of the first through sixth aspects, the report of the first number of bytes is a buffer status report associated with the first communication, wherein the buffer status report indicates a diminished buffer status based at least in part on the second number of bytes.

In an eighth aspect, alone or in combination with one or more of the first through seventh aspects, the diminished buffer status is determined based at least in part on a target modulation and coding scheme for the second communication.

In a ninth aspect, alone or in combination with one or more of the first through eighth aspects, the diminished buffer status is determined based at least in part on a target block error rate for the second communication.

In a tenth aspect, alone or in combination with one or more of the first through ninth aspects, the diminished buffer status is determined based at least in part on a maximum number of bytes associated with the second communication and a maximum number of bytes associated with the first communication.

In an eleventh aspect, alone or in combination with one or more of the first through tenth aspects, the report of the first number of bytes is a buffer status report associated with the first communication associated with the first priority level, wherein the first communication is associated with a non-zero buffer size during the second time interval, and wherein the buffer status report indicates a zero buffer status during the second time interval.

In a twelfth aspect, alone or in combination with one or more of the first through eleventh aspects, the first number of bytes is based at least in part on an energy per byte value of an energy budget associated with the first communication and the second communication.

In a thirteenth aspect, alone or in combination with one or more of the first through twelfth aspects, the energy per byte value is used to determine a byte limit, and wherein the first number of bytes is based at least in part on the byte limit.

In a fourteenth aspect, alone or in combination with one or more of the first through thirteenth aspects, the first number of bytes is associated with a plurality of energy budgets.

In a fifteenth aspect, alone or in combination with one or more of the first through fourteenth aspects, the first number of bytes is based at least in part on a plurality of byte limits associated with the plurality of energy budgets, wherein each energy budget of the plurality of energy budgets is associated with a byte limit of the plurality of byte limits.

In a sixteenth aspect, alone or in combination with one or more of the first through fifteenth aspects, a byte limit, of the plurality of byte limits, is based at least in part on an energy per byte value of a plurality of energy per byte values.

In a seventeenth aspect, alone or in combination with one or more of the first through sixteenth aspects, each energy per byte value of the plurality of energy per byte values is associated with a different energy budget of the plurality of energy budgets.

In an eighteenth aspect, alone or in combination with one or more of the first through seventeenth aspects, the plurality of energy budgets include a first energy budget and a second energy budget that are both associated with a same radio of the UE.

In a nineteenth aspect, alone or in combination with one or more of the first through eighteenth aspects, the plurality of energy budgets include a first energy budget associated with a first radio of the UE and a second energy budget associated with a second radio of the UE.

In a twentieth aspect, alone or in combination with one or more of the first through nineteenth aspects, the first number of bytes is based at least in part on a first set of bearers and a second set of bearers, wherein transmissions on the first set of bearers are throttleable and transmissions on the second set of bearers are not throttleable.

In a twenty-first aspect, alone or in combination with one or more of the first through twentieth aspects, the second communication is transmitted on the second set of bearers.

In a twenty-second aspect, alone or in combination with one or more of the first through twenty-first aspects, the first number of bytes is associated with a first radio and a second radio of the UE, and wherein the first number of bytes is based at least in part on a per-radio allocation of an energy budget of the UE, a first byte limit associated with the first radio, and a second byte limit associated with the second radio.

In a twenty-third aspect, alone or in combination with one or more of the first through twenty-second aspects, the first number of bytes is associated with a first radio and a second radio of the UE, and wherein the first number of bytes is based at least in part on a common byte limit for both the first radio and the second radio.

In a twenty-fourth aspect, alone or in combination with one or more of the first through twenty-third aspects, the buffer status report is per group of logical channels and per radio of the UE.

In a twenty-fifth aspect, alone or in combination with one or more of the first through twenty-fourth aspects, the first number of bytes is based at least in part on reserving an amount of energy for signaling of a control channel or a reference signal.

In a twenty-sixth aspect, alone or in combination with one or more of the first through twenty-fifth aspects, the second priority level is not subject to the uplink transmission interval configuration.

In a twenty-seventh aspect, alone or in combination with one or more of the first through twenty-sixth aspects, the second priority level is associated with at least one of Voice over Internet Protocol traffic, videoing telephony traffic, gaming traffic, real time traffic, a signaling radio bearer, or queue traffic of a radio bearer.

In a twenty-eighth aspect, alone or in combination with one or more of the first through twenty-seventh aspects, the second priority level is associated with a higher priority level than the first priority level.

In a twenty-ninth aspect, alone or in combination with one or more of the first through twenty-eighth aspects, the second communication is transmitted using a power level based at least in part on the transmit configuration irrespective of whether the second communication is transmitted during the first time interval or the second time interval.

In a thirtieth aspect, alone or in combination with one or more of the first through twenty-ninth aspects, the first number of bytes is based at least in part on an average throughput associated with the first priority level and the second number of bytes is based at least in part on an average throughput associated with the second priority level.

In a thirty-first aspect, alone or in combination with one or more of the first through thirtieth aspects, the uplink transmission interval configuration is a thermal transmission configuration.

In a thirty-second aspect, alone or in combination with one or more of the first through thirty-first aspects, the uplink transmission interval configuration is a duty cycle based physical uplink shared channel transmission configuration, wherein the first time interval is an ON duration of the duty cycle based physical uplink shared channel transmission configuration, and wherein the second time interval is an OFF duration of the duty cycle based physical uplink shared channel transmission configuration.

In a thirty-third aspect, alone or in combination with one or more of the first through thirty-second aspects, process 1200 includes determining the second priority level.

In a thirty-fourth aspect, alone or in combination with one or more of the first through thirty-third aspects, process 1200 includes determining that the uplink transmission interval configuration is in use, wherein the second number of bytes is reserved based at least in part on the uplink transmission interval configuration being in use.

In a thirty-fifth aspect, alone or in combination with one or more of the first through thirty-fourth aspects, the first number of bytes is based at least in part on a counter initialized by subtracting, from a total number of bytes allowed for transmission by the UE, the second number of bytes.

In a thirty-sixth aspect, alone or in combination with one or more of the first through thirty-fifth aspects, the counter is decremented by a number of bytes transmitted for the first communication in a shared channel, and wherein, if a size of a grant for a given PUSCH exceeds a current value of the counter, or if no traffic from the second communication is included in a transport block for the given PUSCH, the grant is skipped.

In a thirty-seventh aspect, alone or in combination with one or more of the first through thirty-sixth aspects, transmission of the first number of bytes and transmission of the second number of bytes are cumulatively within a power budget of the UE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The following provides an overview of some aspects of the present disclosure:

Aspect 1: A method of wireless communication performed by a user equipment (UE), comprising: transmitting, based at least in part on a transmit configuration, a first communication associated with at least a portion of an ON duration of an uplink transmission interval configuration, wherein the first communication is associated with a first group of logical channels; and transmitting, based at least in part on the transmit configuration, a second communication during at least a portion of an OFF duration of the uplink transmission interval configuration, wherein the transmit configuration indicates the first number of bytes based at least in part on the first communication being associated with the first group of logical channels and the second number of bytes based at least in part on the second communication being associated with a second group of logical channels.

Aspect 2: The method of any of aspects 1-2, further comprising: determining the transmit configuration based at least in part on an expected payload associated with the second communication.

Aspect 3: The method of any of aspects 1-3, further comprising: determining the transmit configuration based at least in part on a combination of expected payloads associated with each logical channel of the second group of logical channels.

Aspect 4: The method of any of aspects 1-4, wherein an expected payload, of the expected payloads, is based at least in part on at least one of: historical information regarding a payload associated with a logical channel corresponding to the expected payload, a modem configuration of the UE, or information regarding a service associated with the expected payload.

Aspect 5: The method of aspect 25, wherein the report of the first number of bytes is a buffer status report associated with the first communication, wherein the buffer status report indicates a diminished buffer status based at least in part on the second number of bytes.

Aspect 7: The method of aspect 5, wherein the diminished buffer status is determined based at least in part on a target modulation and coding scheme for the second communication.

Aspect 8: The method of aspect 5, wherein the diminished buffer status is determined based at least in part on a target block error rate for the second communication.

Aspect 9: The method of aspect 5, wherein the diminished buffer status is determined based at least in part on a maximum number of bytes associated with the second communication and a maximum number of bytes associated with the first communication.

Aspect 10: The method of any of aspects 1-9, wherein the first number of bytes is based at least in part on reserving an amount of energy for signaling of a control channel or a reference signal.

Aspect 11: The method of any of aspects 1-10, wherein the second group of logical channels is not subject to the uplink transmission interval configuration.

Aspect 12: The method of any of aspects 1-11, wherein the second group of logical channels is associated with at least one of: Voice over Internet Protocol traffic, video telephony traffic, a signaling radio bearer, or default bearer priority queue traffic.

Aspect 13: The method of any of aspects 1-12, wherein the second group of logical channels is associated with a higher priority level than the first group of logical channels.

Aspect 14: The method of any of aspects 1-13, wherein the second communication is transmitted using a power level based at least in part on the transmit configuration irrespective of whether the second communication is transmitted during the ON duration or the OFF duration.

Aspect 15: The method of any of aspects 1-14, wherein the report of the first number of bytes is a buffer status report associated with the first communication associated with the first group of logical channels, and wherein the buffer status report indicates a zero buffer status.

Aspect 16: The method of any of aspects 1-15, wherein the first number of bytes is based at least in part on an average throughput associated with the first group of logical channels and the second number of bytes is based at least in part on an average throughput associated with the second group of logical channels.

Aspect 17: The method of any of aspects 1-16, wherein the uplink transmission interval configuration is a thermal transmission configuration.

Aspect 18: The method of any of aspects 1-17, wherein the uplink transmission interval configuration is a duty cycle based physical uplink shared channel transmission configuration.

Aspect 19: The method of any of aspects 1-18, further comprising: determining the second group of logical channels.

Aspect 20: The method of any of aspects 1-19, further comprising: determining that the uplink transmission interval configuration is in use, wherein the second number of bytes is reserved based at least in part on the uplink transmission interval configuration being in use.

Aspect 21: The method of any of aspects 1-20, wherein the first number of bytes is based at least in part on a counter initialized by subtracting, from a total number of bytes allowed for transmission by the UE, the second number of bytes.

Aspect 22: the method of any of aspects 1-21, wherein the counter is decremented by a number of bytes transmitted for the first communication in a shared channel.

Aspect 23: the method of aspect 22, wherein, if a size of a grant for a given PUSCH exceeds a current value of the counter, or if no traffic from the second communication is included in a transport block for the given PUSCH, the grant is skipped.

Aspect 24: the method of any of aspects 1-4 or 10-23, wherein the first communication includes a set of payload bytes generated by a service associated with the first group of logical channels, the set of payload bytes including the first number of bytes.

Aspect 25: the method of any of aspects 1-4 or 10-24, wherein the first communication includes a report of a buffer status indicating the first number of bytes associated with the first communication.

Aspect 26: A method of wireless communication performed by a user equipment (UE), comprising: transmitting, based at least in part on a transmit configuration, a first communication associated with at least a portion of a first time interval of an uplink transmission interval configuration, wherein the first communication is associated with a first priority level and a first number of bytes; and transmitting, based at least in part on the transmit configuration, a second communication during at least a portion of a second time interval of the uplink transmission interval configuration, wherein the transmit configuration indicates the first number of bytes based at least in part on the first communication being associated with the first priority level and a second number of bytes based at least in part on the second communication being associated with a second priority level.

Aspect 27: The method of Aspect 26, wherein the first number of bytes is associated with a first amount of energy and the second number of bytes is associated with a second amount of energy, wherein the first amount of energy is designed to reserve the second amount of energy for transmission of the second communication.

Aspect 28: The method of any of Aspects 26-27, further comprising: determining the transmit configuration based at least in part on an expected payload associated with the second communication.

Aspect 29: The method of any of Aspects 26-28, further comprising: determining the transmit configuration based at least in part on a combination of expected payloads associated with each logical channel of the second communication.

Aspect 30: The method of Aspect 29, wherein an expected payload, of the expected payloads, is based at least in part on at least one of: historical information regarding a payload associated with a logical channel corresponding to the expected payload, a modem configuration of the UE, or information regarding a service associated with the expected payload.

Aspect 31: The method of any of Aspects 26-30, wherein the first communication includes a set of payload bytes generated by a service associated with the first priority level, the set of payload bytes including the first number of bytes.

Aspect 32: The method of any of Aspects 26-31, wherein the first communication includes a report of a buffer status indicating the first number of bytes associated with the first communication.

Aspect 33: The method of Aspect 32, wherein the report of the first number of bytes is a buffer status report associated with the first communication, wherein the buffer status report indicates a diminished buffer status based at least in part on the second number of bytes.

Aspect 34: The method of Aspect 33, wherein the diminished buffer status is determined based at least in part on a target modulation and coding scheme for the second communication.

Aspect 35: The method of Aspect 33, wherein the diminished buffer status is determined based at least in part on a target block error rate for the second communication.

Aspect 36: The method of Aspect 33, wherein the diminished buffer status is determined based at least in part on a maximum number of bytes associated with the second communication and a maximum number of bytes associated with the first communication.

Aspect 37: The method of Aspect 33, wherein the report of the first number of bytes is a buffer status report associated with the first communication associated with the first priority level, wherein the first communication is associated with a non-zero buffer size during the second time interval, and wherein the buffer status report indicates a zero buffer status during the second time interval.

Aspect 38: The method of Aspect 33, wherein the first number of bytes is based at least in part on an energy per byte value of an energy budget associated with the first communication and the second communication.

Aspect 39: The method of Aspect 38, wherein the energy per byte value is used to determine a byte limit, and wherein the first number of bytes is based at least in part on the byte limit.

Aspect 40: The method of Aspect 33, wherein the first number of bytes is associated with a plurality of energy budgets.

Aspect 41: The method of Aspect 40, wherein the first number of bytes is based at least in part on a plurality of byte limits associated with the plurality of energy budgets, wherein each energy budget of the plurality of energy budgets is associated with a byte limit of the plurality of byte limits.

Aspect 42: The method of Aspect 41, wherein a byte limit, of the plurality of byte limits, is based at least in part on an energy per byte value of a plurality of energy per byte values.

Aspect 43: The method of Aspect 42, wherein each energy per byte value of the plurality of energy per byte values is associated with a different energy budget of the plurality of energy budgets.

Aspect 44: The method of Aspect 40, wherein the plurality of energy budgets include a first energy budget and a second energy budget that are both associated with a same radio of the UE.

Aspect 45: The method of Aspect 40, wherein the plurality of energy budgets include a first energy budget associated with a first radio of the UE and a second energy budget associated with a second radio of the UE.

Aspect 46: The method of Aspect 40, wherein the first number of bytes is based at least in part on a first set of bearers and a second set of bearers, wherein transmissions on the first set of bearers are throttleable and transmissions on the second set of bearers are not throttleable.

Aspect 47: The method of Aspect 46, wherein the second communication is transmitted on the second set of bearers.

Aspect 48: The method of Aspect 40, wherein the first number of bytes is associated with a first radio and a second radio of the UE, and wherein the first number of bytes is based at least in part on a per-radio allocation of an energy budget of the UE, a first byte limit associated with the first radio, and a second byte limit associated with the second radio.

Aspect 49: The method of Aspect 40, wherein the first number of bytes is associated with a first radio and a second radio of the UE, and wherein the first number of bytes is based at least in part on a common byte limit for both the first radio and the second radio.

Aspect 50: The method of Aspect 40, wherein the buffer status report is per group of logical channels and per radio of the UE.

Aspect 51: The method of any of Aspects 26-50, wherein the first number of bytes is based at least in part on reserving an amount of energy for signaling of a control channel or a reference signal.

Aspect 52: The method of any of Aspects 26-51, wherein the second priority level is not subject to the uplink transmission interval configuration.

Aspect 53: The method of any of Aspects 26-52, wherein the second priority level is associated with at least one of: Voice over Internet Protocol traffic, video telephony traffic, gaming traffic, real time traffic, a signaling radio bearer, or priority queue traffic of a radio bearer.

Aspect 54: The method of any of Aspects 26-53, wherein the second priority level is associated with a higher priority level than the first priority level.

Aspect 55: The method of any of Aspects 26-54, wherein the second communication is transmitted using a power level based at least in part on the transmit configuration irrespective of whether the second communication is transmitted during the first time interval or the second time interval.

Aspect 56: The method of any of Aspects 26-55, wherein the first number of bytes is based at least in part on an average throughput associated with the first priority level and the second number of bytes is based at least in part on an average throughput associated with the second priority level.

Aspect 57: The method of any of Aspects 26-56, wherein the uplink transmission interval configuration is a thermal transmission configuration.

Aspect 58: The method of any of Aspects 26-57, wherein the uplink transmission interval configuration is a duty cycle based physical uplink shared channel transmission configuration, wherein the first time interval is an ON duration of the duty cycle based physical uplink shared channel transmission configuration, and wherein the second time interval is an OFF duration of the duty cycle based physical uplink shared channel transmission configuration.

Aspect 59: The method of any of Aspects 26-58, further comprising: determining the second priority level.

Aspect 60: The method of any of Aspects 26-59, further comprising: determining that the uplink transmission interval configuration is in use, wherein the second number of bytes is reserved based at least in part on the uplink transmission interval configuration being in use.

Aspect 61: The method of any of Aspects 26-60, wherein the first number of bytes is based at least in part on a counter initialized by subtracting, from a total number of bytes allowed for transmission by the UE, the second number of bytes.

Aspect 62: The method of Aspect 61, wherein the counter is decremented by a number of bytes transmitted for the first communication in a shared channel, and wherein, if a size of a grant for a given PUSCH exceeds a current value of the counter, or if no traffic from the second communication is included in a transport block for the given PUSCH, the grant is skipped.

Aspect 63: The method of any of Aspects 26-62, wherein transmission of the first number of bytes and transmission of the second number of bytes are cumulatively within a power budget of the UE.

Aspect 64: An apparatus for wireless communication at a device, comprising a processor; memory coupled with the processor; and instructions stored in the memory and executable by the processor to cause the apparatus to perform the method of one or more aspects of aspects 1-63.

Aspect 65: A device for wireless communication, comprising a memory and one or more processors coupled to the memory, the memory and the one or more processors configured to perform the method of one or more aspects of aspects 1-63.

Aspect 66: An apparatus for wireless communication, comprising at least one means for performing the method of one or more aspects of aspects 1-63.

Aspect 67: A non-transitory computer-readable medium storing code for wireless communication, the code comprising instructions executable by a processor to perform the method of one or more aspects of aspects 1-63.

Aspect 68: A non-transitory computer-readable medium storing a set of instructions for wireless communication, the set of instructions comprising one or more instructions that, when executed by one or more processors of a device, cause the device to perform the method of one or more aspects of aspects 1-63.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

transmitting, based at least in part on a transmit configuration, a first communication associated with at least a portion of a first time interval of an uplink transmission interval configuration, wherein the first communication is associated with a first priority level and a first number of bytes, wherein the first communication includes a report of a buffer status indicating a modified buffer status, wherein the modified buffer status is based at least in part on a second communication associated with a second priority level; and transmitting, based at least in part on the transmit configuration, the second communication during at least a portion of a second time interval of the uplink transmission interval configuration, wherein the transmit configuration indicates the first number of bytes based at least in part on the first communication being associated with the first priority level and the transmit configuration indicates a second number of bytes based at least in part on the second communication being associated with the second priority level.

2. The method of claim 1, wherein the first number of bytes is associated with a first amount of energy and the second number of bytes is associated with a second amount of energy, wherein the first amount of energy is designed to reserve the second amount of energy for transmission of the second communication.

3. The method of claim 1, further comprising:

determining the transmit configuration based at least in part on an expected payload associated with the second communication.

4. The method of claim 1, further comprising:

determining the transmit configuration based at least in part on a combination of expected payloads associated with each logical channel of the second communication.

5. The method of claim 1, wherein the first communication includes a set of payload bytes generated by a service associated with the first priority level, the set of payload bytes including the first number of bytes.

6. The method of claim 1, wherein the report of the buffer status indicates the first number of bytes associated with the first communication.

7. The method of claim 6, wherein the report of the buffer status indicates a diminished buffer status based at least in part on the second number of bytes.

8. The method of claim 7, wherein the diminished buffer status is determined based at least in part on a target modulation and coding scheme for the second communication.

9. The method of claim 7, wherein the diminished buffer status is determined based at least in part on a target block error rate for the second communication.

10. The method of claim 7, wherein the diminished buffer status is determined based at least in part on a maximum number of bytes associated with the second communication and a maximum number of bytes associated with the first communication.

11. The method of claim 7, wherein the report of the first number of bytes is a buffer status report associated with the first communication associated with the first priority level, wherein the first communication is associated with a non-zero buffer size during the second time interval, and wherein the buffer status report indicates a zero buffer status during the second time interval.

12. The method of claim 7, wherein the first number of bytes is based at least in part on an energy per byte value of an energy budget associated with the first communication and the second communication.

13. The method of claim 12, wherein the energy per byte value is used to determine a byte limit, and wherein the first number of bytes is based at least in part on the byte limit.

14. The method of claim 7, wherein the first number of bytes is associated with a plurality of energy budgets.

15. The method of claim 14, wherein the first number of bytes is based at least in part on a plurality of byte limits associated with the plurality of energy budgets, wherein each energy budget of the plurality of energy budgets is associated with a byte limit of the plurality of byte limits.

16. The method of claim 15, wherein a byte limit, of the plurality of byte limits, is based at least in part on an energy per byte value of a plurality of energy per byte values.

17. The method of claim 14, wherein the plurality of energy budgets include a first energy budget and a second energy budget that are both associated with a same radio of the UE.

18. The method of claim 14, wherein the plurality of energy budgets include a first energy budget associated with a first radio of the UE and a second energy budget associated with a second radio of the UE.

19. The method of claim 14, wherein the first number of bytes is based at least in part on a first set of bearers and a second set of bearers, wherein transmissions on the first set of bearers are throttleable and transmissions on the second set of bearers are not throttleable.

20. The method of claim 14, wherein the first number of bytes is associated with a first radio and a second radio of the UE, and wherein the first number of bytes is based at least in part on a per-radio allocation of an energy budget of the UE, a first byte limit associated with the first radio, and a second byte limit associated with the second radio.

21. The method of claim 14, wherein the first number of bytes is associated with a first radio and a second radio of the UE, and wherein the first number of bytes is based at least in part on a common byte limit for both the first radio and the second radio.

22. The method of claim 14, wherein the buffer status report is per group of logical channels and per radio of the UE.

23. The method of claim 1, wherein the first number of bytes is based at least in part on reserving an amount of energy for signaling of a control channel or a reference signal.

24. The method of claim 1, wherein the second priority level is associated with a higher priority level than the first priority level.

25. The method of claim 1, wherein the second communication is transmitted using a power level based at least in part on the transmit configuration irrespective of whether the second communication is transmitted during the first time interval or the second time interval.

26. The method of claim 1, wherein the first number of bytes is based at least in part on an average throughput associated with the first priority level and the second number of bytes is based at least in part on an average throughput associated with the second priority level.

27. The method of claim 1, wherein the uplink transmission interval configuration is a duty cycle based physical uplink shared channel transmission configuration, wherein the first time interval is an ON duration of the duty cycle based physical uplink shared channel transmission configuration, and wherein the second time interval is an OFF duration of the duty cycle based physical uplink shared channel transmission configuration.

28. A user equipment (UE) for wireless communication, comprising:

one or more memories; and one or more processors, coupled to the one or more memories, configured to:

transmit, based at least in part on a transmit configuration, a first communication associated with at least a portion of a first time interval of an uplink transmission interval configuration, wherein the first communication is associated with a first priority level and a first number of bytes, wherein the first communication includes a report of a buffer status indicating a modified buffer status, wherein the modified buffer status is based at least in part on a second communication associated with a second priority level; and transmit, based at least in part on the transmit configuration, the second communication during at least a portion of a second time interval of the uplink transmission interval configuration, wherein the transmit configuration indicates the first number of bytes based at least in part on the first communication being associated with the first priority level and the transmit configuration indicates a second number of bytes based at least in part on the second communication being associated with the second priority level.

29. A non-transitory computer-readable medium storing a set of instructions for wireless communication, the set of instructions comprising:

one or more instructions that, when executed by one or more processors of a user equipment (UE), cause the UE to:

transmit, based at least in part on a transmit configuration, a first communication associated with at least a portion of a first time interval of an uplink transmission interval configuration, wherein the first communication is associated with a first priority level and a first number of bytes, wherein the first communication includes a report of a buffer status indicating a modified buffer status, wherein the modified buffer status is based at least in part on a second communication associated with a second priority level; and transmit, based at least in part on the transmit configuration, the second communication during at least a portion of a second time interval of the uplink transmission interval configuration, wherein the transmit configuration indicates the first number of bytes based at least in part on the first communication being associated with the first priority level and the transmit configuration indicates a second number of bytes based at least in part on the second communication being associated with the second priority level.

30. An apparatus for wireless communication, comprising:

means for transmitting, based at least in part on a transmit configuration, a first communication associated with at least a portion of a first time interval of an uplink transmission interval configuration, wherein the first communication is associated with a first priority level and a first number of bytes, wherein the first communication includes a report of a buffer status indicating a modified buffer status, wherein the modified buffer status is based at least in part on a second communication associated with a second priority level; and means for transmitting, based at least in part on the transmit configuration, the second communication during at least a portion of a second time interval of the uplink transmission interval configuration, wherein the transmit configuration indicates the first number of bytes based at least in part on the first communication being associated with the first priority level and the transmit configuration indicates a second number of bytes based at least in part on the second communication being associated with the second priority level.

31. The method of claim 6, wherein transmitting the first communication further comprises:

transmitting the first communication, comprising the report of the buffer status, periodically.

32. The UE of claim 28, wherein the report of the buffer status indicates the first number of bytes associated with the first communication.

33. The UE of claim 32, wherein the report of the buffer status indicates a diminished buffer status based at least in part on the second number of bytes.

34. The UE of claim 33, wherein the one or more processors, to transmit the first communication, are further configured to:

transmit the first communication, comprising the report of the buffer status, periodically.

35. The UE of claim 33, wherein the diminished buffer status is determined based at least in part on a target modulation and coding scheme for the second communication.

36. The UE of claim 33, wherein the diminished buffer status is determined based at least in part on a target block error rate for the second communication.

37. The UE of claim 33, wherein the diminished buffer status is determined based at least in part on a maximum number of bytes associated with the second communication and a maximum number of bytes associated with the first communication.

38. The UE of claim 33, wherein the report of the first number of bytes is a buffer status report associated with the first communication associated with the first priority level, wherein the first communication is associated with a non-zero buffer size during the second time interval, and wherein the buffer status report indicates a zero buffer status during the second time interval.

39. The non-transitory computer-readable medium of claim 29, wherein the report of the buffer status indicates the first number of bytes associated with the first communication.

40. The non-transitory computer-readable medium of claim 39, wherein the report of the buffer status indicates a diminished buffer status based at least in part on the second number of bytes.

41. The non-transitory computer-readable medium of claim 40, wherein the one or more instructions, to cause the UE to transmit the first communication, are further executable to cause the UE to:

transmit the first communication, comprising the report of the buffer status, periodically.

42. The non-transitory computer-readable medium of claim 40, wherein the diminished buffer status is determined based at least in part on a target modulation and coding scheme for the second communication.

43. The non-transitory computer-readable medium of claim 40, wherein the diminished buffer status is determined based at least in part on a target block error rate for the second communication.

44. The non-transitory computer-readable medium of claim 40, wherein the diminished buffer status is determined based at least in part on a maximum number of bytes associated with the second communication and a maximum number of bytes associated with the first communication.

45. The non-transitory computer-readable medium of claim 40, wherein the report of the first number of bytes is a buffer status report associated with the first communication associated with the first priority level, wherein the first communication is associated with a non-zero buffer size during the second time interval, and wherein the buffer status report indicates a zero buffer status during the second time interval.

46. The apparatus of claim 30, wherein the first communication includes a report of a buffer status indicating the first number of bytes associated with the first communication.

47. The apparatus of claim 46, wherein the report of the first number of bytes is a buffer status report associated with the first communication, wherein the buffer status report indicates a diminished buffer status based at least in part on the second number of bytes.

48. The apparatus of claim 47, wherein the diminished buffer status is determined based at least in part on a target modulation and coding scheme for the second communication.

49. The apparatus of claim 47, wherein the diminished buffer status is determined based at least in part on a target block error rate for the second communication.

50. The apparatus of claim 47, wherein the diminished buffer status is determined based at least in part on a maximum number of bytes associated with the second communication and a maximum number of bytes associated with the first communication.

* * * * *